US012659510B2

(12) United States Patent
Oh et al.

(10) Patent No.: US 12,659,510 B2
(45) Date of Patent: Jun. 16, 2026

(54) POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 616 days.

(21) Appl. No.: 17/923,152

(22) PCT Filed: May 31, 2021

(86) PCT No.: PCT/KR2021/006730
§ 371 (c)(1),
(2) Date: Nov. 3, 2022

(87) PCT Pub. No.: WO2021/242065
PCT Pub. Date: Dec. 2, 2021

(65) Prior Publication Data
US 2024/0276013 A1 Aug. 15, 2024

(30) Foreign Application Priority Data
May 29, 2020 (KR) ........................ 10-2020-0065245

(51) Int. Cl.
*H04N 19/597* (2014.01)
*H04N 19/119* (2014.01)
*H04N 19/96* (2014.01)

(52) U.S. Cl.
CPC ......... *H04N 19/597* (2014.11); *H04N 19/119* (2014.11); *H04N 19/96* (2014.11)

(58) Field of Classification Search
CPC ..... H04N 19/597; H04N 19/119; H04N 19/96
See application file for complete search history.

(56) References Cited

U.S. PATENT DOCUMENTS

2018/0144545 A1 5/2018 Legrand et al.
2019/0311501 A1* 10/2019 Mammou ............... G06T 9/001
(Continued)

FOREIGN PATENT DOCUMENTS

KR 1020140056290 A 5/2014
KR 1020200024219 A 3/2020
KR 20200141065 A * 12/2020 ............. G06T 9/005

OTHER PUBLICATIONS

Lasserre Sebastien translation of KR 20200141065 A Apr. 3, 2019 (Year: 2019).*

(Continued)

*Primary Examiner* — Zaihan Jiang
(74) *Attorney, Agent, or Firm* — Bryan Cave Leighton Paisner LLP

(57) ABSTRACT

A point cloud data transmission method according to embodiments may comprise the steps of: encoding point cloud data; and transmitting a bitstream including the point cloud data. A point cloud data reception method according to embodiments may comprise the steps of: receiving a bitstream including point cloud data; and decoding the point cloud data.

14 Claims, 34 Drawing Sheets

(56) References Cited

U.S. PATENT DOCUMENTS

| | | | | |
|---|---|---|---|---|
| 2020/0413096 A1* | 12/2020 | Zhang | .................. | H04N 19/176 |
| 2021/0084333 A1* | 3/2021 | Zhang | .................... | H04N 19/46 |
| 2021/0250594 A1* | 8/2021 | Gao | .......................... | G06T 9/40 |
| 2021/0383575 A1* | 12/2021 | Zhang | ........................ | G06T 9/40 |
| 2021/0385494 A1* | 12/2021 | Zhang | .................. | H04N 19/647 |
| 2022/0232253 A1* | 7/2022 | Gao | .................... | H04N 19/119 |
| 2022/0343556 A1* | 10/2022 | Iguchi | .................... | G06T 9/001 |

OTHER PUBLICATIONS

Lasserre Sebastien translation of KR 20200141065 A 2019-04-03
(Year: 2019).*
3DG "G-PCC codec description v4," ISO/IEC JTC1/SC29/WG11,
62 pages, Sep. 2019.
Zhang et al. "[G-PCC][New proposal] Implicit geometry partition
for point cloud coding," ISO/IEC JTC1/SC29/WG11 MPEG209/
m49231, 14 pages, Jul. 2019.
K. Mammou et al., "G-PCC codec description v2", International
Organisation for Standardisation Organisation Internationale De
Normalisation ISO/IEC JTC1/SC29/WG11 Coding of Moving Pic-
tures and Audio, N18189, Jan. 2019.
X. Zhang et al., "Implicit Geometry Partition for Point Cloud
Compression", 2020 Data Compression Conference (DCC), pp.
73-82, Mar. 27, 2020.

* cited by examiner

FIG. 7
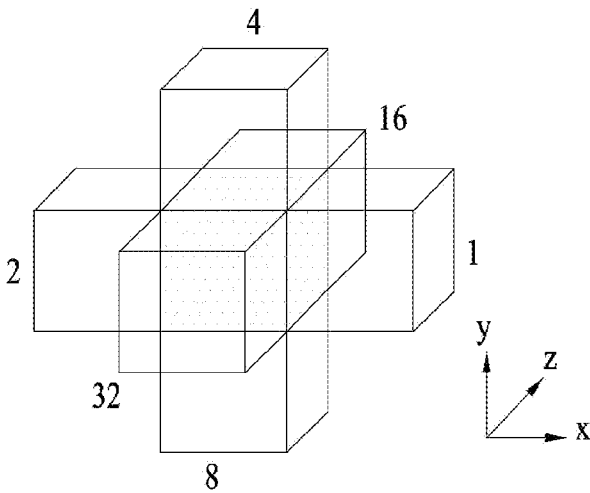
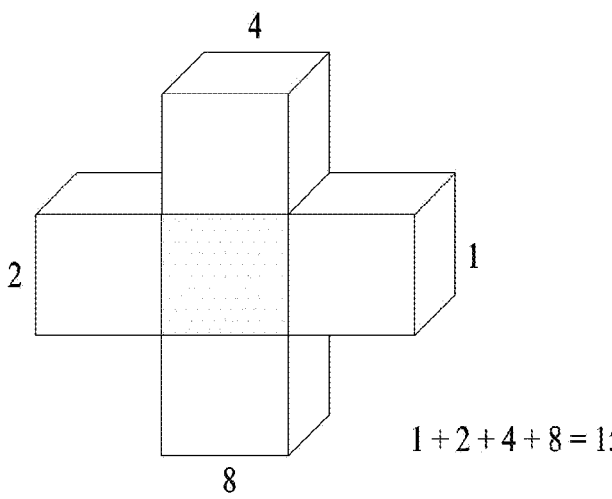
$$1 + 2 + 4 + 8 = 15$$

Level of details

FIG. 16

| Sequence | K | M | BD-rate |
|---|---|---|---|
| 'landscape_00014_vox14' | 0 | 1 | -3.0% |
| 'ulb_unicorn_vox20' | 0 | 0 | -2.0% |
| 'citytunnel_q1mm' | 0 | 4 | -0.9% |
| 'overpass_q1mm' | 0 | 3 | -1.3% |
| 'tollbooth_q1mm' | 0 | 2 | -4.0% |

FIG. 17
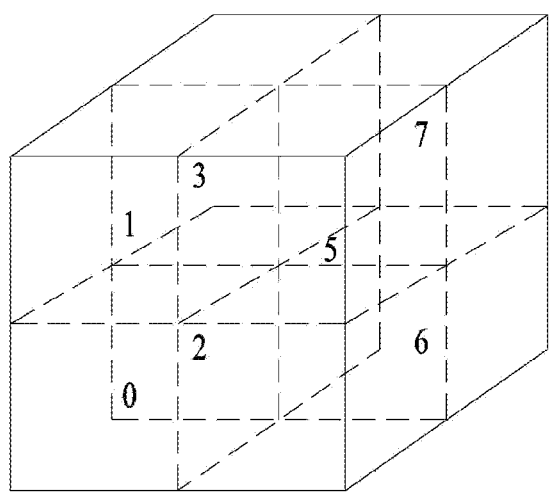
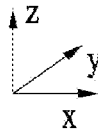

FIG. 18
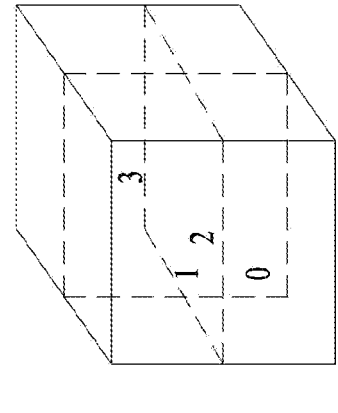
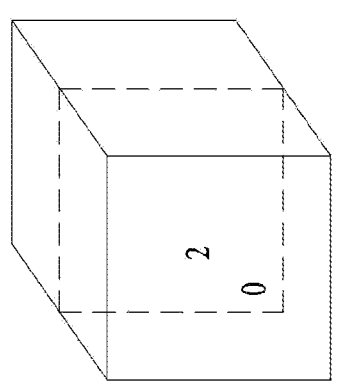
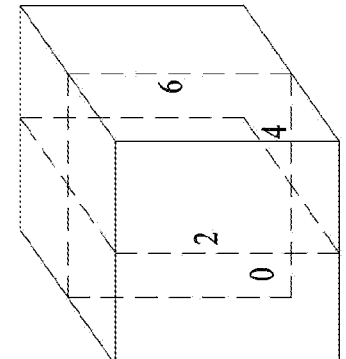
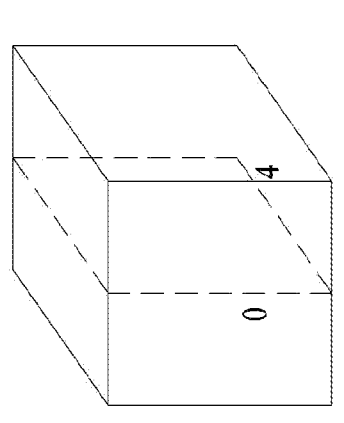
Quad-tree partition of a 3D cube, along x-y, x-z, y-z axes, respectively.
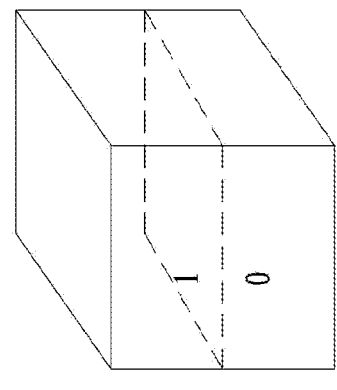
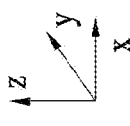
Binary-tree partition of a 3D cube, along x, y, z axis, respectively.

Scheme 2: QT&BT after OT

Scheme 3: Hybrid partition

Scheme 4: Hybrid with constraint

FIG. 24

| | Required bits if occupancy is as shown in figures | Required bits at worst case of full occupancy |
|---|---|---|
| Scheme 1 | $1 \times 4 + 4 \times 4 + 8 \times 2 + 9 \times 2 = 54$ | $1 \times 4 + 4 \times 4 + 16 \times + 32 \times 2 = 116$ |
| Scheme 2 | $1 \times 2 + 2 \times 2 + 4 \times 4 + 7 \times 4 = 50$ | $1 \times 2 + 2 \times 4 + 4 \times 4 + 16 \times 4 = 86$ |
| Scheme 3 | $1 \times 2 + 2 \times 4 + 5 \times 4 + 9 \times 2 = 48$ | $1 \times 2 + 2 \times 4 + 8 \times 4 + 32 \times 2 = 106$ |
| Scheme 4 | $1 \times 2 + 2 \times 4 + 5 \times 2 + 7 \times 4 = 48$ | $1 \times 2 + 2 \times 4 + 8 \times 2 + 16 \times 4 = 90$ |
| Scheme in TMC13 | $1 \times 4 + 2 \times 4 + 4 \times 4 + 7 \times 4 = 56$ | $1 \times 4 + 2 \times 4 + 4 \times 4 + 16 \times 4 = 92$ |

FIG. 25

$$r_{OT}(i) = 1 - \frac{N_{occupied}\,(OT,i)}{N_{nodes}\,(OT,i)}$$

— 25000

$$r_{QT}(i) = 1 - \frac{N_{occupied}\,(QT,i)}{N_{nodes}\,(QT,i)}$$

$$r_{BT}(i) = 1 - \frac{N_{occupied}\,(BT,i)}{N_{nodes}\,(BT,i)}$$

$$N_{OT}(i) = \min \left( d_{\chi}(i), d_{y}(i), d_{z}(i) \right)$$
$$N_{BT}(i) = \min \left( d_{\chi}(i), d_{y}(i), d_{z}(i) \right)$$
$$N_{QT}(i) = \text{med} \left( d_{\chi}(i), d_{y}(i), d_{z}(i) \right) \text{ or else}$$

$$d_{\chi}(i) = \log_{2} \left( x \text{ directional sub - node length} \right)$$
$$d_{y}(i) = \log_{2} \left( y \text{ directional sub - node length} \right)$$
$$d_{z}(i) = \log_{2} \left( z \text{ directional sub - node length} \right)$$

FIG. 27

$$\text{partitioning type (i)} = \begin{cases} OT, & \text{if } r_{OT}(i) \geq r_{BT}(i),\ r_{OT}(i) \geq r_{QT}(i),\ OT(i) > 0 \\ QT, & \text{if } r_{QT}(i) > r_{BT}(i),\ r_{QT}(i) > r_{OT}(i),\ QT(i) > 0 \text{ or if } OT(i) => 0 \\ BT, & \text{if } r_{BT}(i) > r_{QT}(i),\ r_{BT}(i) > r_{OT}(i),\ BT(i) > 0 \text{ or if } QT(i) = 0 \end{cases}$$

First partitioning : $QT(1) = 2, BT(1) = 4,$    $r_{QT}(1) = 0/4, r_{BT}(1) = 0/2 \rightarrow$ partitioning type $(1) = QT$
Second partitioning : $QT(1) = 1, BT(1) = 3,$    $r_{QT}(2) = 8/16, r_{BT}(2) = 3/8 \rightarrow$ partitioning type $(2) = QT$
Third partitioning : $QT(3) = 0, BT(3) = 2,$    $\rightarrow$ partitioning type $(3) = BT$   (along x axis)
Fourth partitioning : $QT(4) = 0, BT(4) = 1,$    $\rightarrow$ partitioning type $(4) = BT$   (along x axis)

$$\text{partitioning type (i)} = \begin{cases} OT, & \text{if } r_{OT}(i) > r_{BT}(i),\ r_{OT}(i) > r_{QT}(i),\ OT(i) > 0 \\ QT, & \text{if } r_{QT}(i) > r_{BT}(i),\ r_{QT}(i) > r_{OT}(i),\ QT(i) > 0 \text{ or if } OT(i) => 0 \\ BT, & \text{if } r_{BT}(i) \geq r_{QT}(i),\ r_{BT}(i) \geq r_{OT}(i),\ BT(i) > 0 \text{ or if } QT(i) = 0 \end{cases}$$

첫 번째 partitioning : $QT(1) = 2, BT(1) = 4,$    $r_{QT}(1) = 0/4, r_{BT}(1) = 0/2 \rightarrow$ partitioning type $(1) = QT$ (along x axis )
두 번째 partitioning : $QT(1) = 2, BT(1) = 3,$    $r_{QT}(2) = 3/8, r_{BT}(2) = 0/4 \rightarrow$ partitioning type $(2) = QT$
세 번째 partitioning : $QT(3) = 1, BT(3) = 2,$    $r_{QT}(3) = 11/20, r_{BT}(3) = 3/10 \rightarrow$ partitioning type $(3) = QT$
네 번째 partitioning : $QT(4) = 0, BT(4) = 1,$    $\rightarrow$ partitioning type $(4) = BT$

FIG. 28

| geometry_parameter_set( ) { | Descriptor |
|---|---|
| .... | |
|     num_tree_depth_minus1 | u(8) |
|     for( i=0; i< num_tree_depth_minus1+1; i++) { | |
|        partition_type // 0 for OT | u(2) |
|        if( partition_type == 1) // QT | |
|           partition_axis // partition along the xy, yz, xz axis | u(2) |
|        if( partition_type == 2 ) // BT | |
|           partition_axis // partition along the x, y, z axis | u(2) |
|        log2_node_size_x | u(8) |
|        log2_node_size_y | u(8) |
|        log2_node_size_z | u(8) |
|     } | |
|     .... | |

FIG. 29

| geometry_slice_bitstream( ) { | Descriptor |
|---|---|
| geometry_slice_bitstream( ) { | |
| geometry_slice_data( ) | |
| } | |

| geometry_slice_header( ) { | Descriptor |
|---|---|
| .... | |
| num_tree_depth_minus1 | u(8) |
| full_depth_present_flag | u(1) |
| if( !full_depth_present_flag ) { | |
| start_tree_depth | u(8) |
| end_tree_depth | u(8) |
| START = start_tree_depth; | |
| END = end_tree_depth; | |
| } | |
| else { | |
| num_tree_depth_minus1 | u(8) |
| START = 0; | |
| END = num_tree_depth_minus1 + 1; | |
| } | |
| for( i=START; i< END; i++) { | |
| partition_type // 0 for OT | u(2) |
| if( partition_type == 1) // QT | |
| partition_axis // partition along the xy, yz, xz axis | u(2) |
| if( partition_type == 2 ) // BT | |
| partition_axis // partition along the x, y, z axis | u(2) |
| log2_node_size_x | u(8) |
| log2_node_size_y | u(8) |
| log2_node_size_z | u(8) |
| } | |
| .... | |

FIG. 32

3300 —| Encoding point cloud data |

3301 —| Transmitting bitstream containing point cloud data |

3400 —|  Receiving bitstream containing
point cloud data

3401 —|  Decoding point cloud data

POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

CROSS-REFERENCE TO RELATED APPLICATION

This application is the National Stage filing under 35 U.S.C. 371 of International Application No. PCT/KR2021/006730, filed May 31, 2021, which claims priority to and the benefit of Korean Patent Application No. 10-2020-0065245, filed on May 29, 2020, the disclosure of which is incorporated herein by reference in its entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method for transmitting point cloud data may include encoding the point cloud data, and transmitting a bitstream containing the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 7 shows an example of a neighbor node pattern according to embodiments;

FIG. 16 illustrates a compression rate according to embodiments;

FIG. 17 shows points and a cube according to embodiments;

FIG. 18 illustrates a quad tree and a binary tree according to embodiments;

FIG. 24 shows bit usages compared with each other according to embodiments;

FIG. 25 illustrates a scheme for selecting a partitioning method according to embodiments;

FIG. 26 illustrates a scheme for selecting a partitioning method according to embodiments;

FIG. 27 illustrates conditions for selecting a partitioning method according to embodiments;

FIG. 28 shows a set of geometry parameters according to embodiments;

FIG. 29 illustrates a geometry slice bitstream and a geometry slice header according to embodiments;

FIG. 32 is a flowchart illustrating encoding of point cloud data according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
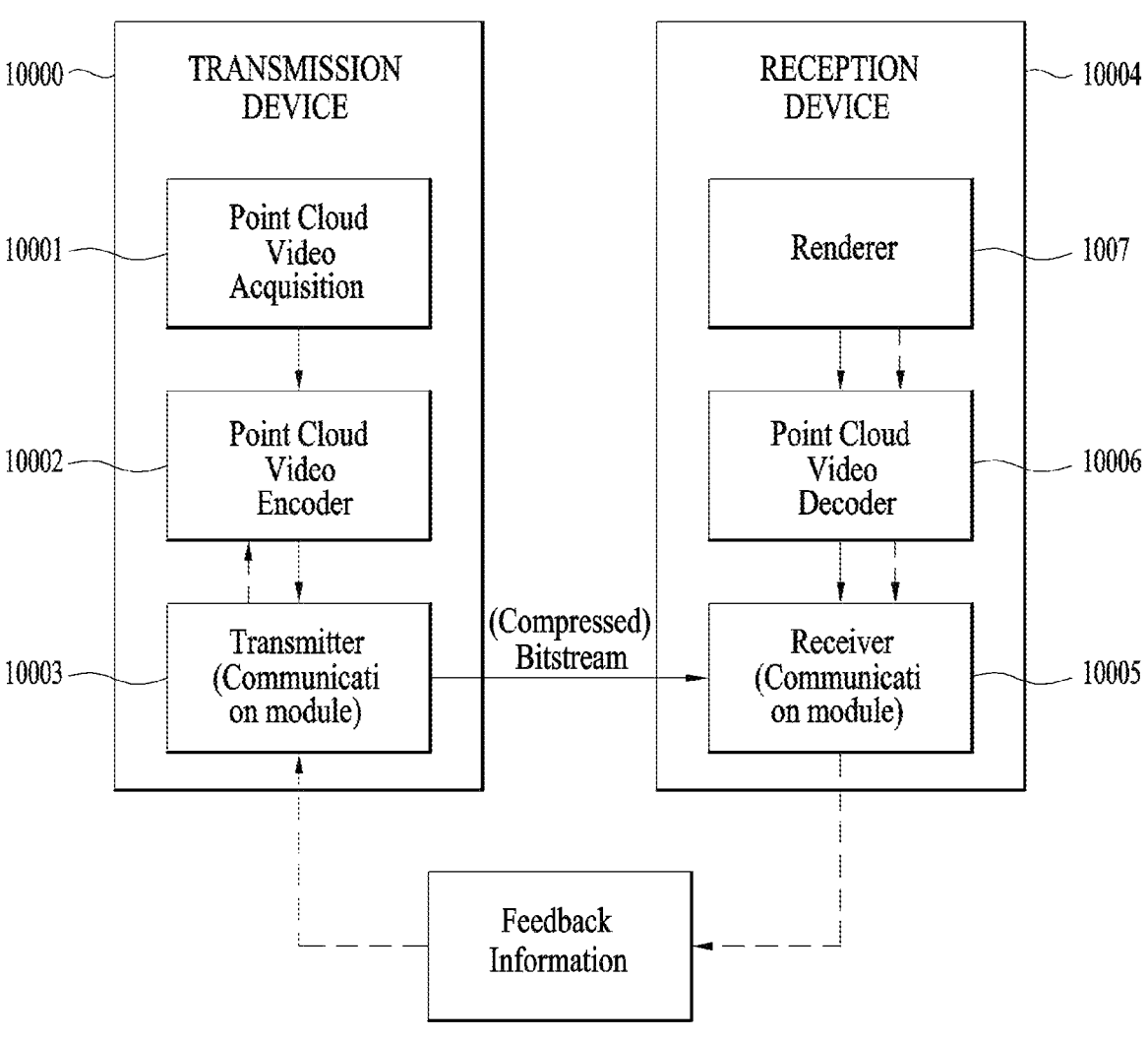
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/ segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
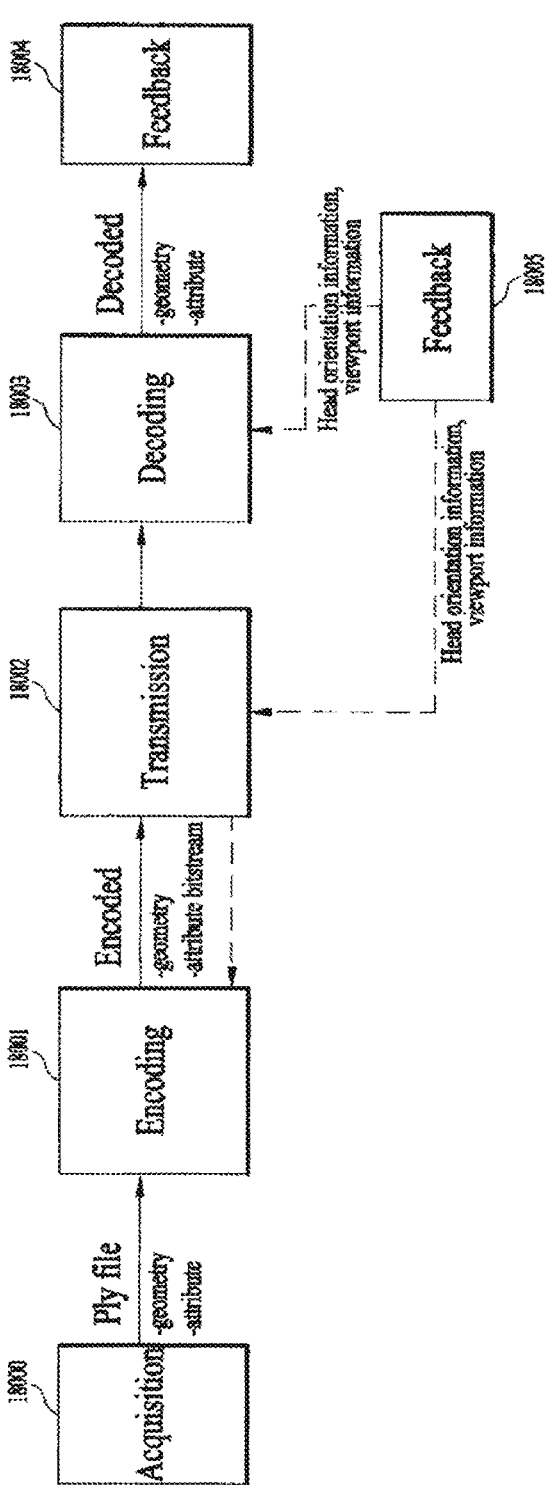
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
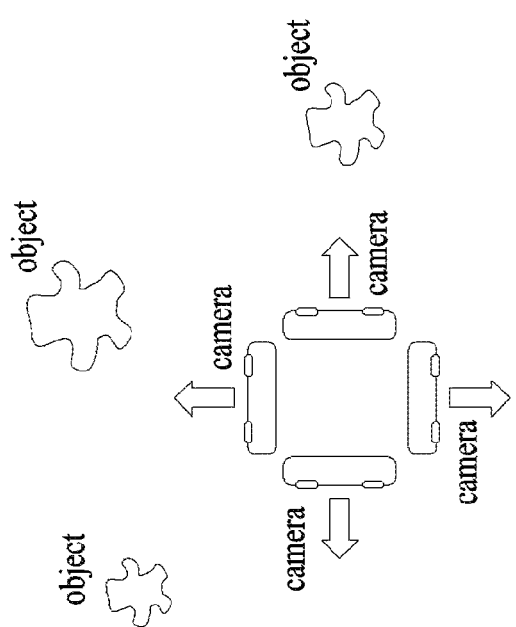
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
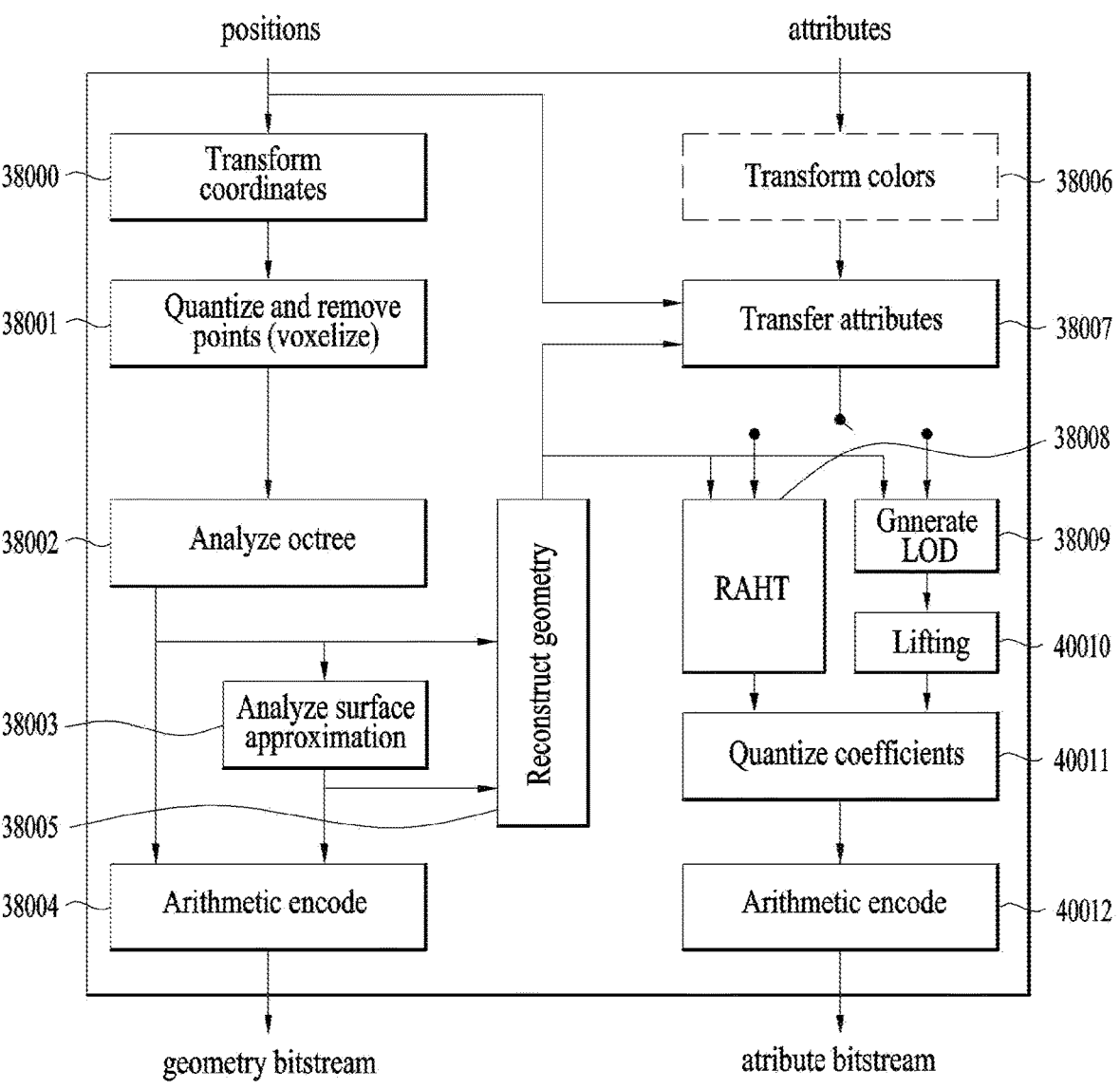
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates all representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
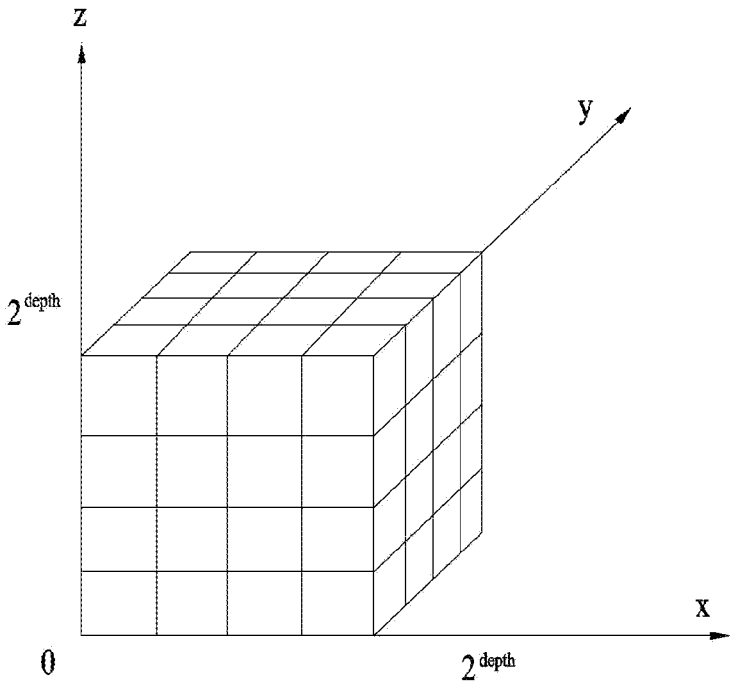
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and $(2^d, 2^d, 2^d)$ is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
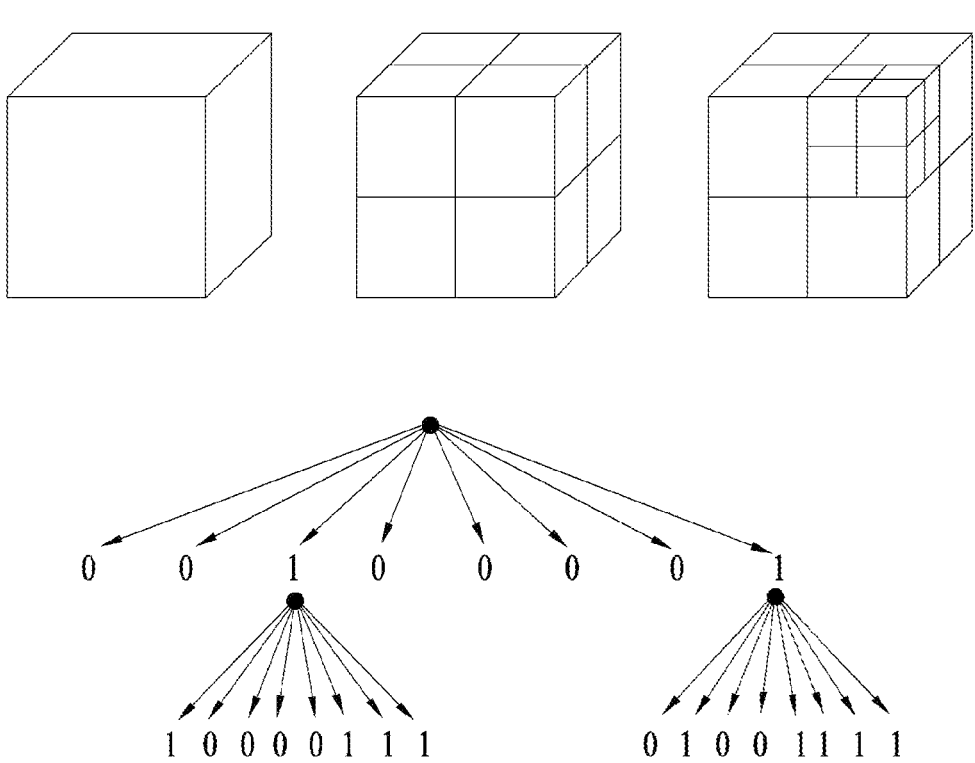
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles $(0, 0, 0)$ and $(2^d, 2^d, 2^d)$. Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}\left(\text{Log2}\left(\text{Max}\left(x^{int}_n, y^{int}_n, z^{int}_n, n = 1, \dots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector $(\Delta x, \Delta y, \Delta z)$ of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n} \begin{bmatrix} x_i \\ y_i \\ z_i \end{bmatrix};$$ i)

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$ ii)

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$ iii)

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n | |
| --- | --- |
| n | triangles |
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
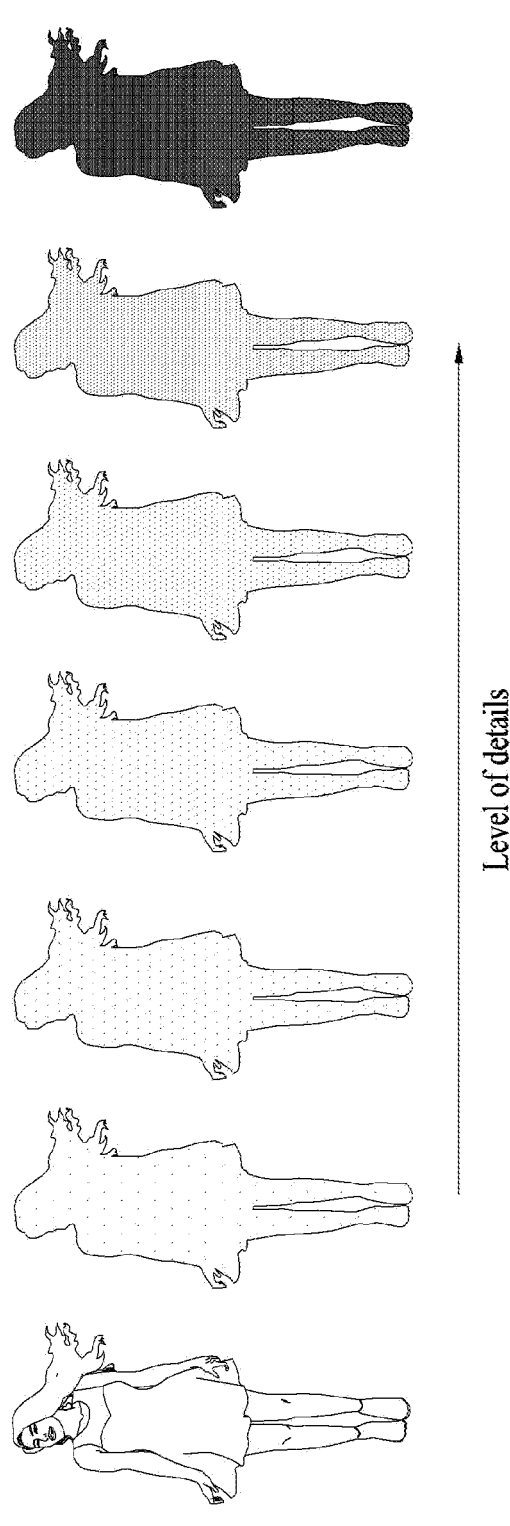
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
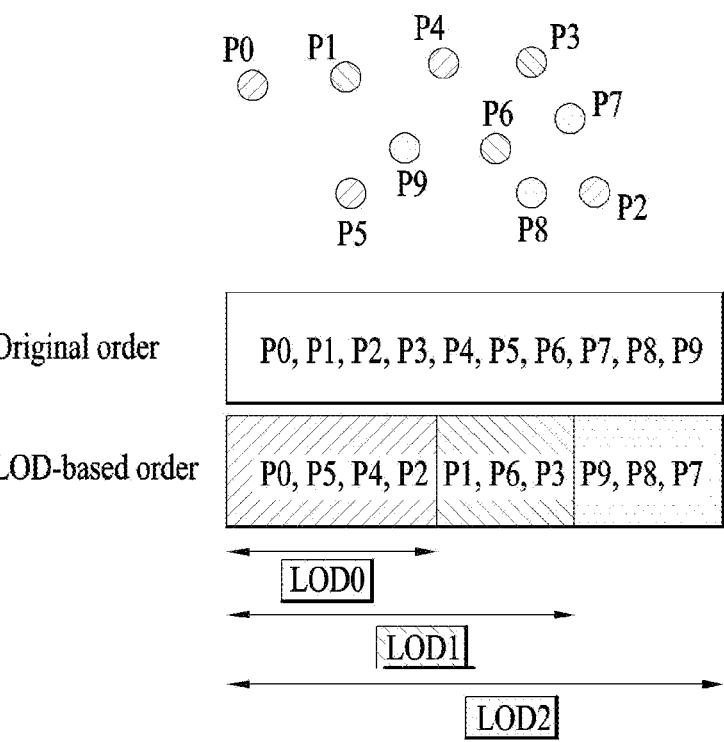
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

```
TABLE Attribute prediction residuals quantization pseudo code
int PCCQuantization(int value, int quantStep) {
if( value >=0) {
return floor(value / quantStep + 1.0 / 3.0);
} else {
return −floor(−value / quantStep + 1.0 / 3.0);
}
}
TABLE Attribute prediction residuals inverse quantization pseudo code
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,x}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} T_{w1\,w2} \begin{bmatrix} g_{l_{2x,y,z}} \\ g_{l_{2x+1,y,z}} \end{bmatrix}, T_{w1\,w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

Figure 10:
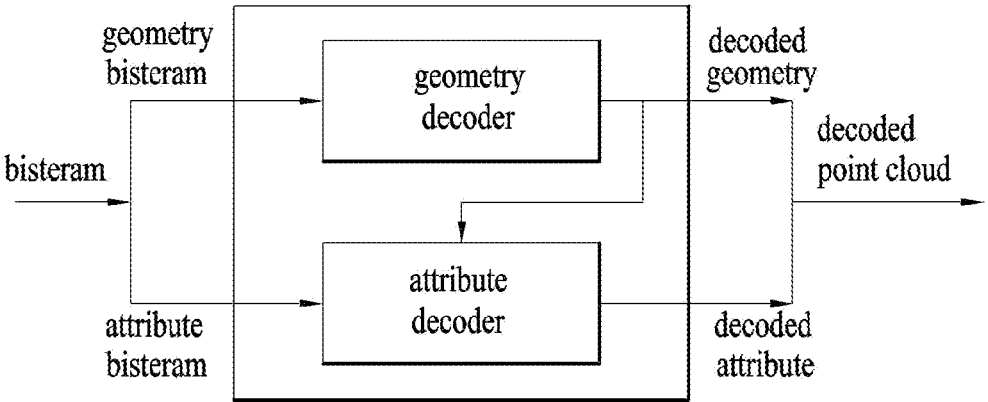
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
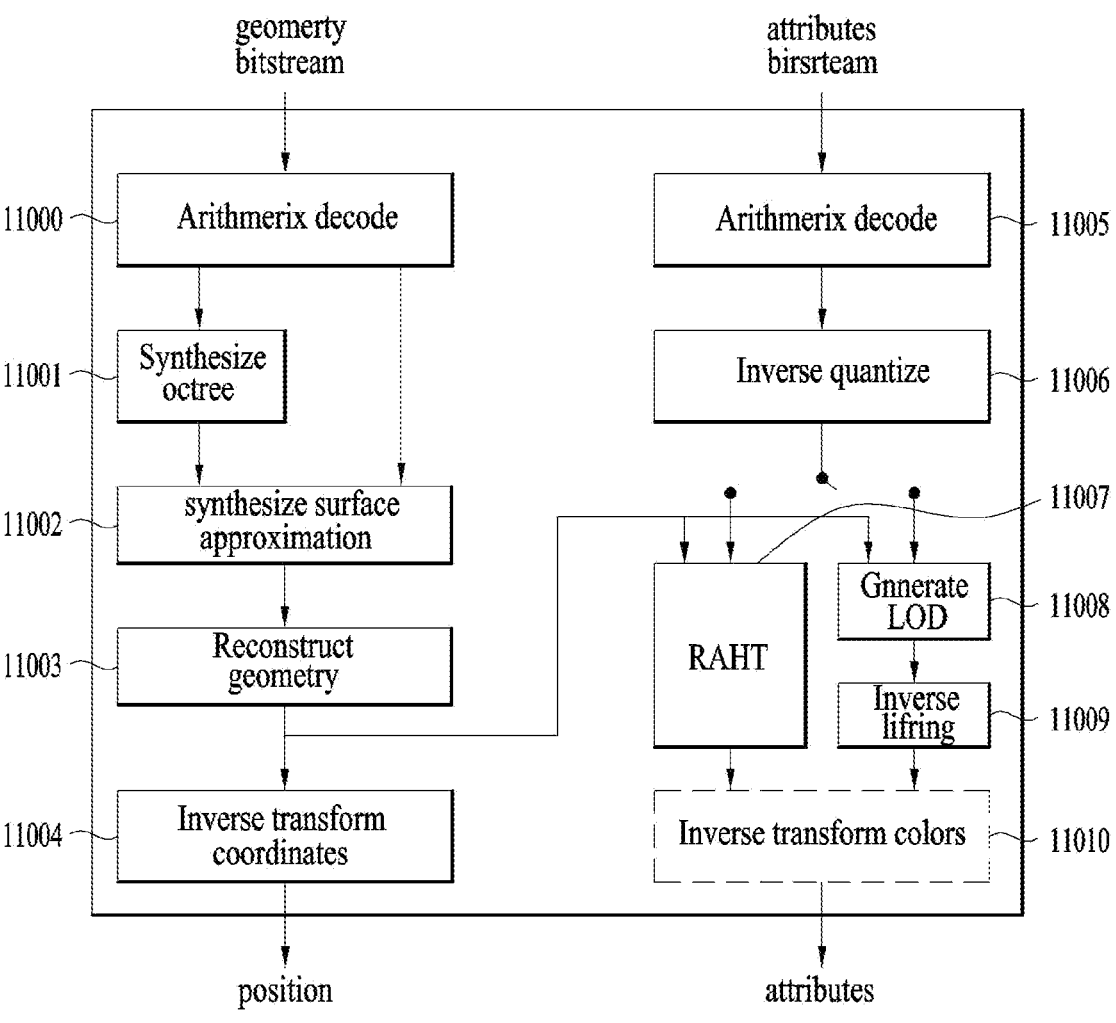
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
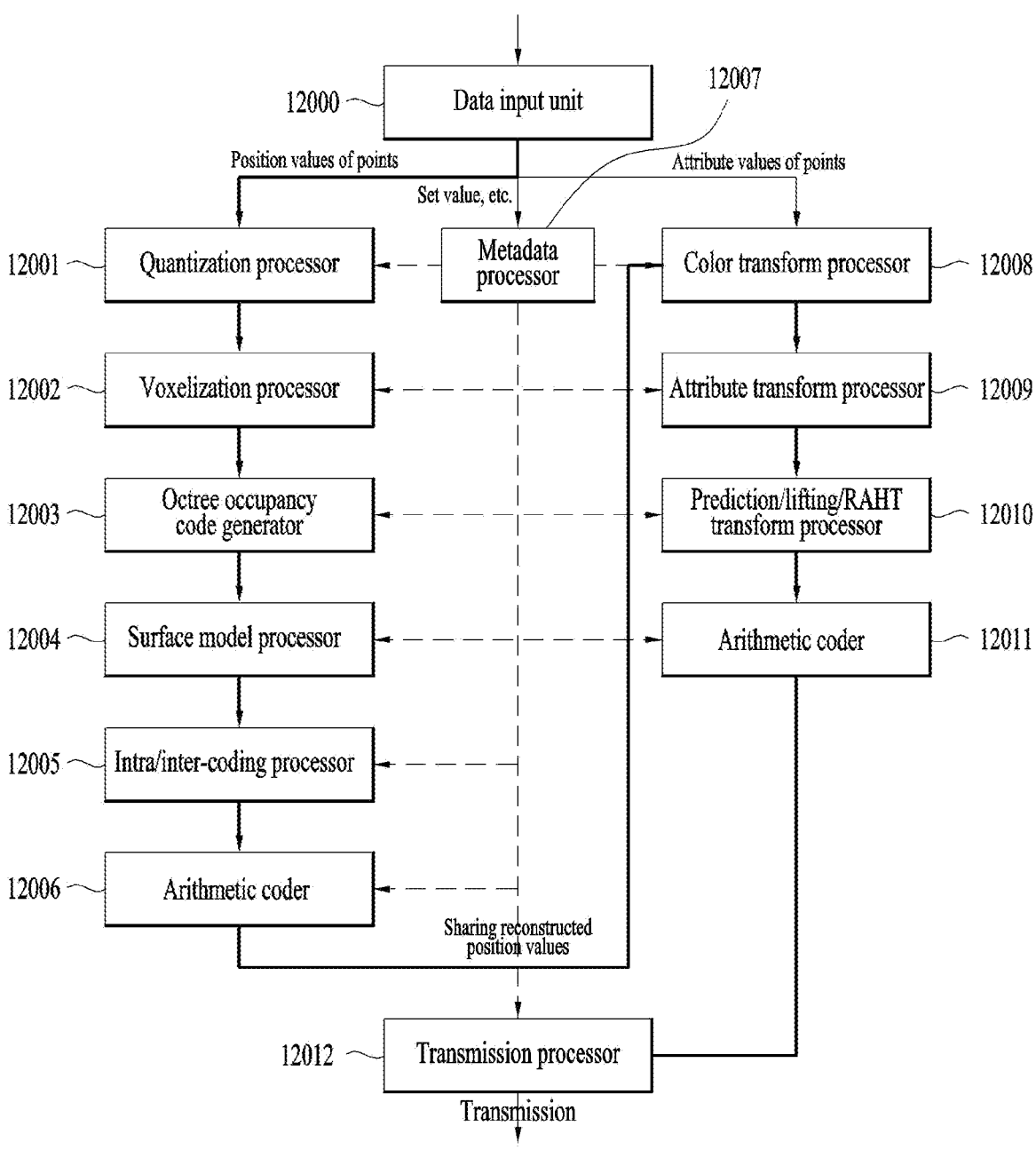
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information accordinging to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
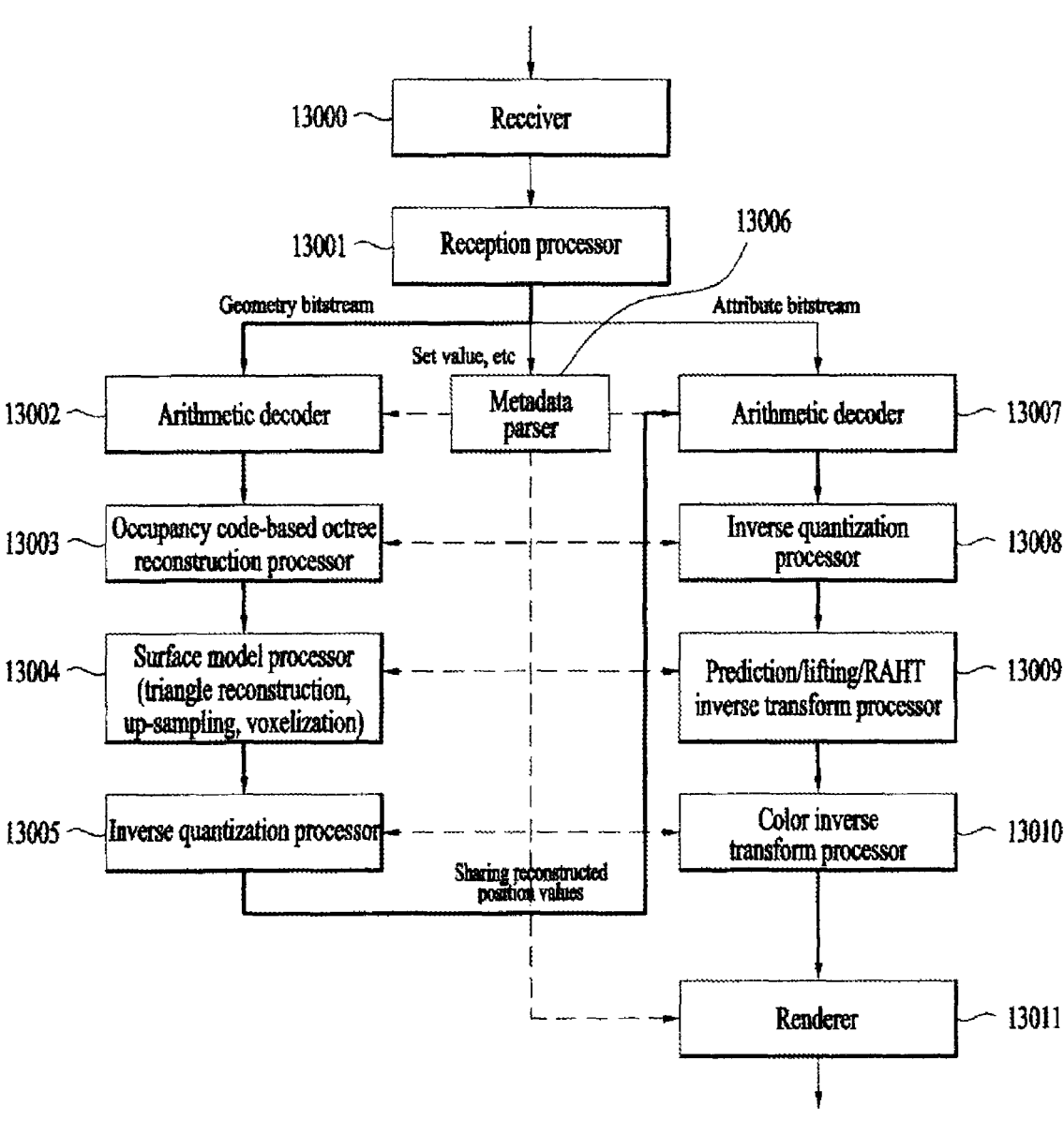
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
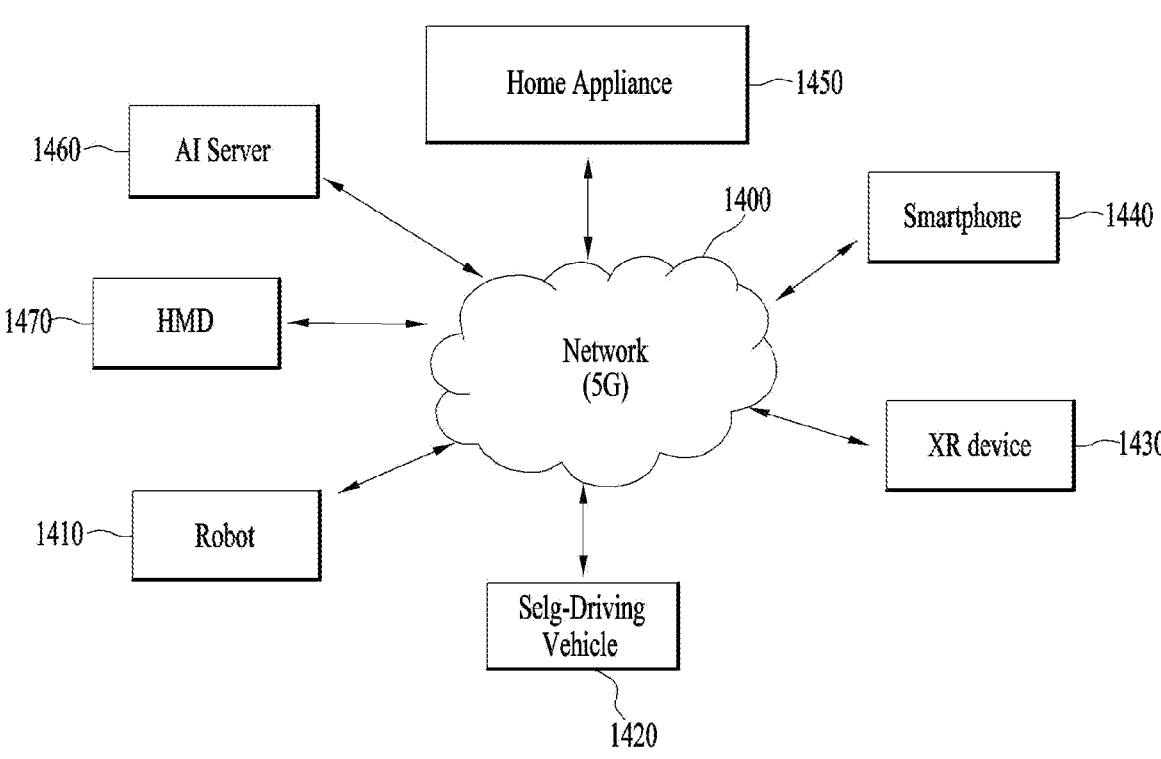
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 20:
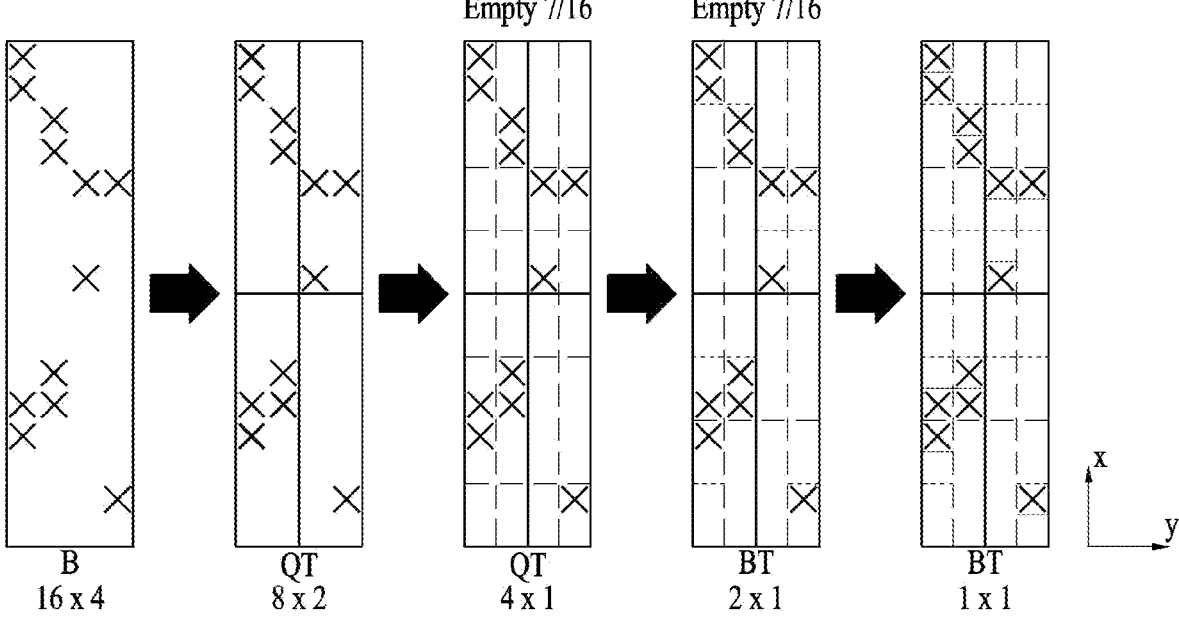
FIG. 20 illustrates partitioning according to embodiments.
Figure 22:
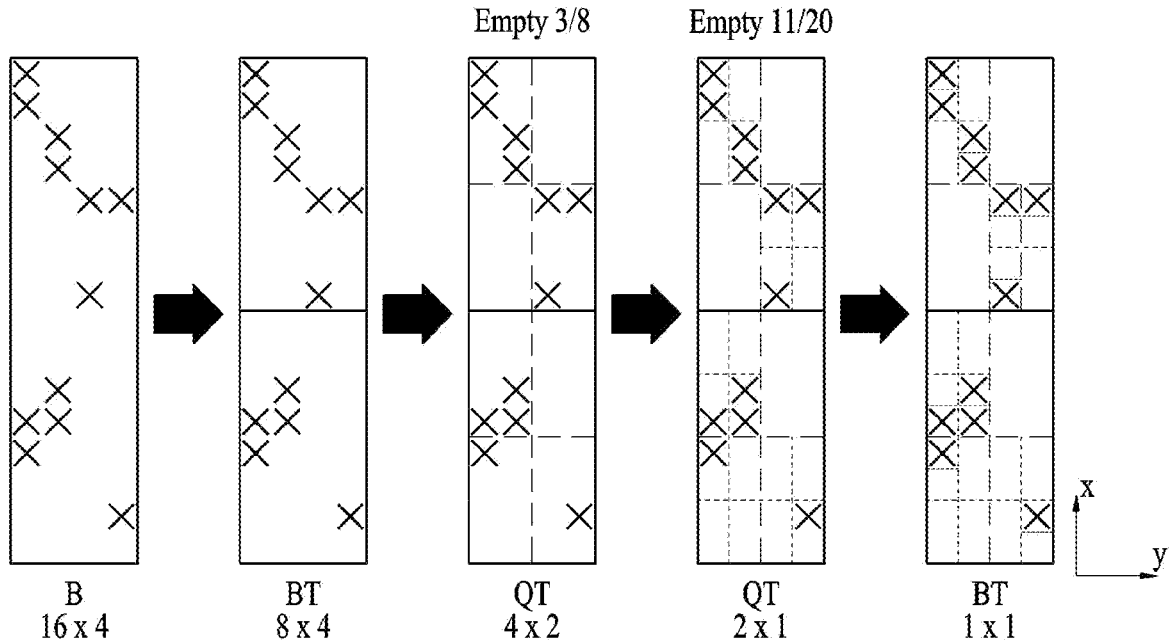
FIG. 22 illustrates partitioning according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoding process of FIGS. 20 and 22, and the like.

Figure 21:
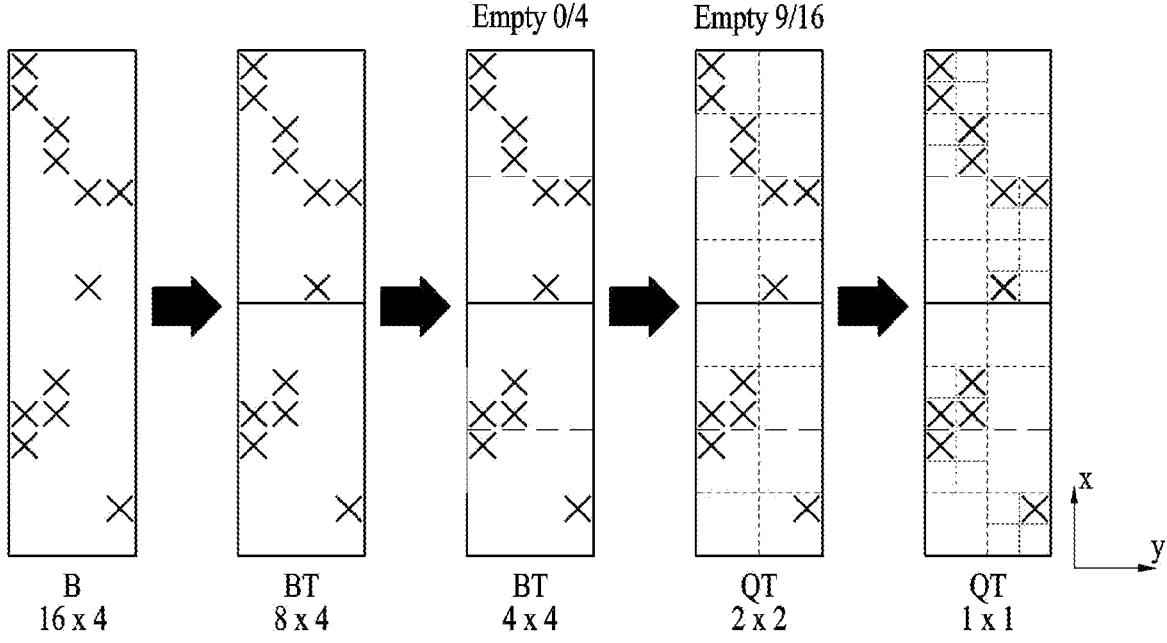
FIG. 21 illustrates partitioning according to embodiments.
Figure 23:
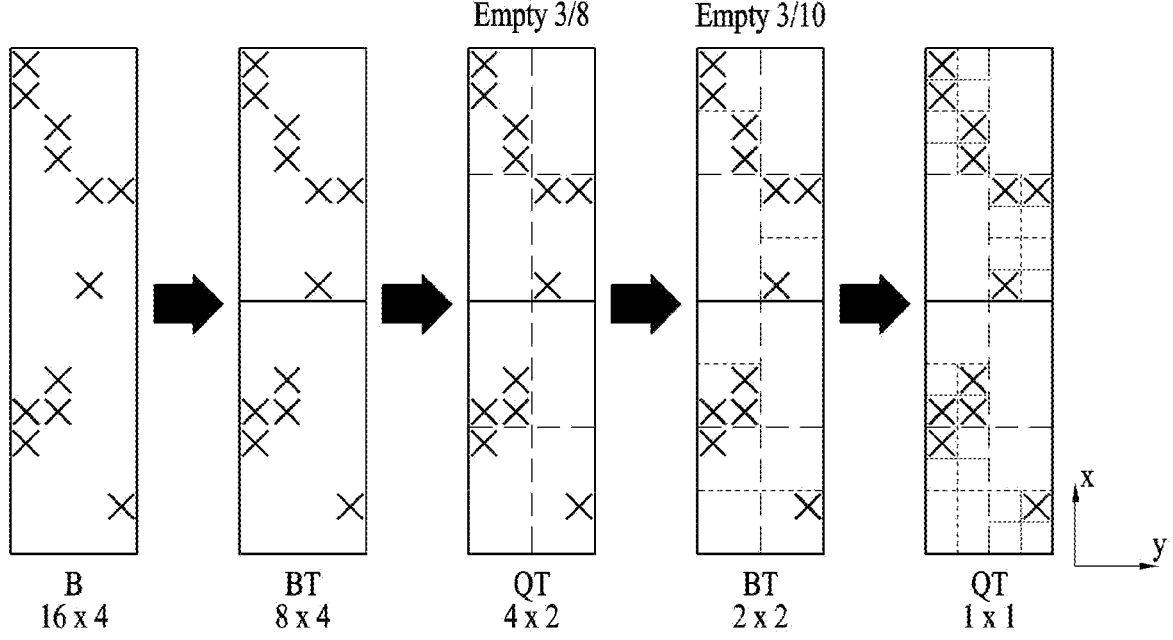
FIG. 23 illustrates partitioning according to embodiments.

The point cloud data reception method/device according to embodiments may be construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoding process of FIGS. 21 and 23, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

Figure 15:
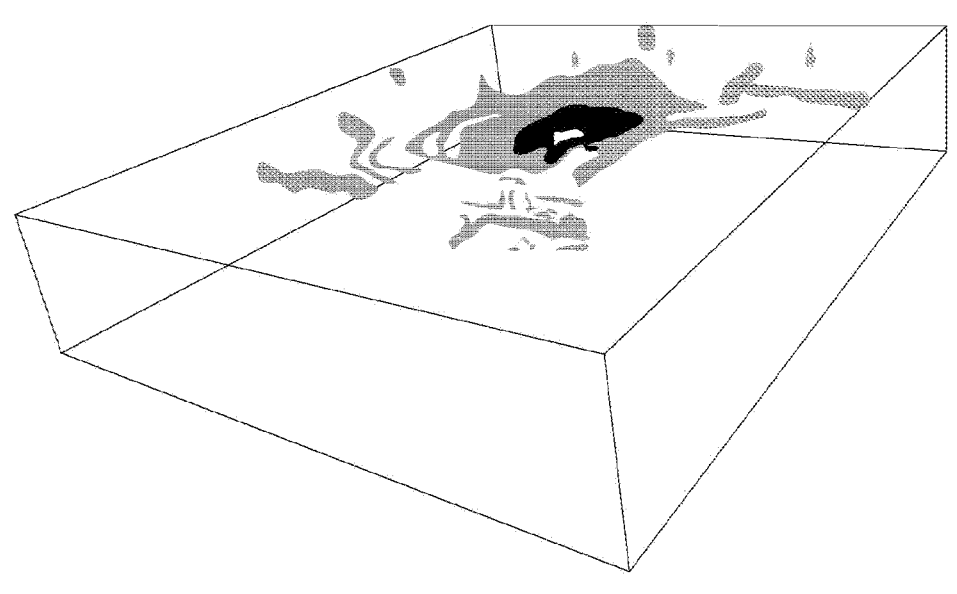
FIG. 15 illustrates a distribution of point cloud data according to embodiments.

FIG. 15 illustrates a distribution of point cloud data according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data shown in FIG. 15. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data shown in FIG. 15.

The transmission device 10000 of FIG. 1, the point cloud video encoder 10002 of FIG. 1, the encoding of FIG. 2, the encoder of FIG. 4, the transmission device of FIG. 13, or the device of FIG. 14 may compress (encode) the point cloud data shown in FIG. 15 using an optimal position structure based on asymmetric partitioning. The reception device 10004 of FIG. 1, the point cloud video decoder 10006 of FIG. 1, the decoding of FIG. 2, the decoder of FIGS. 10 and 11, the reception device of FIG. 14, or the device of FIG. 14 may reconstruct (decode) the point cloud data shown in FIG. 15 using an optimal position structure based on asymmetric partitioning.

In order to efficiently compress and provide point cloud data through a service, position information may be compressed and reconstructed based on the distribution of the data. In this case, the positions may be compressed and reconstructed based on the characteristics of the asymmetric data distribution.

The method/device according to the embodiments may compress and reconstruct point cloud data. Specifically, it may compress and reconstruct a position (geometry data) in consideration of the asymmetric point distribution.

The point cloud data includes position (geometry: e.g., XYZ coordinate) and attribute (e.g., color, reflectance, etc.) information related to each data. According to embodiments, a position may be referred to as geometry data and an attribute may be referred to as attribute data.

In order to compress the position information and attribute information, in particular, the position information for efficient compression, an octree (OT)-based compression method is used. In this case, a method of quad tree (QT) or binary tree (BT) based position compression may be used to increase the efficiency of position compression for asymmetrically distributed points. That is, when 8 node positions constituting an octree are distributed biased toward one plane or one line segment, the number of bits used for position compression may be reduced by using the QT or BT.

As shown in FIG. 15, the points constituting the point cloud data may have a shape having a specific directionality in space. In order to efficiently compress and reconstruct the points, a cube of specific dimensions may be used, and the points may be compressed and reconstructed based on bounding boxes having various shapes adaptively according to the distribution map. Such bounding boxes based on various shapes may be provided by QT, BT, or the like according to embodiments.

FIG. 16 illustrates a compression rate according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data shown in FIG. 15 using QT, BT, or the like. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data shown in FIG. 15 using the QT, BT, or the like according to the embodiments.

When the method/device according to the embodiments uses OT, QT, BT, or the like to consider asymmetric point distribution in compressing/reconstructing point cloud positions, a unit node used at each depth of the position information tree may have a different ratio of width, depth, and height. In this case, different compression efficiencies may be obtained according to the order in which the OT, QT, and BT are used.

In FIG. 16. a compression rate obtained when a QTBT parameter is fixed is compared with a compression rate obtained when different parameters are used according to a sequence.

It may be seen that the compression rate obtained when the values of the parameter K and the parameter M according to the embodiments are different from each other is better than when the values are the same.

As such, an optimal position compression method and a parameter configuration method for optimal compression providing a good compression rate in consideration of an asymmetric point distribution according to embodiments will be described.

FIG. 17 shows points and a cube according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data shown in FIG. 17. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data shown in FIG. 15.

Furthermore, among the methods for scalable point cloud encoding/decoding, a compression/decompression method based on asymmetric node partitioning may be used. The compression/reconstruction method according to the embodiments may be used when the QTBT-based position compression/reconstruction method is used.

The method/device according to the embodiments may provide scalable point cloud coding, and may adaptively provide a point cloud service in a low-latency environment. In addition, the position compression/reconstruction method (geometry encoding and geometry decoding) according to the embodiments may be used independently of the attribute compression/reconstruction method (attribute encoding, attribute decoding), and may also be used for attribute compression/reconstruction based on the method according to the embodiments.

In order to compress/reconstruct the position information about the point cloud, the method/device according to the embodiments may carry out a method of octree-based partitioning, by which a cube is equally divided into eight cubes. In this method, the process of dividing an occupied node (which is a node containing a point) among the 8 nodes into 8 cubes by dividing each side of the node into halves is repeated. Whether each node is occupied may be indicated as 0 or 1 by using 1 bit in order. That is, when a cube is divided into 8 sub-nodes, 8 bits may be used to indicate whether 8 sub-nodes are occupied (e.g., when nodes 0, 3, 4, and 5 are occupied among the 8 nodes, the occupancy of each node may be indicated as 10011100).

FIG. 18 illustrates a quad tree and a binary tree according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data based on a quad tree and a binary tree as shown in FIG. 18. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data based on the quad tree and the binary tree as shown in FIG. 18.

When the point distribution is not uniform, the number of bits used to indicate the occupancy may be saved by using a quad-tree or a binary tree according to the characteristics of the point distribution (4 bits may be skipped with the QT and 6 bits may be skipped with the BT).

FIG. 18 shows a case where a cube is divided in a three-dimensional space according to a quad-tree (QT) and a binary tree (BT). For example, when the distributed nodes are divided according to a quad-tree in the x-y direction and nodes 0 and 6 are occupied, the occupancy may be indicated by 1001 while indicating the quad-tree in the x-y direction.

For example, a space in which points are distributed may be represented as a bounding box. The bounding box may be referred to as a 3D cube. A 3D cube of points may be partitioned using the X, Y, Z coordinate system. Partitioning is dividing a space to divide points. A quad tree and/or a binary tree may be used adaptively according to a point distribution in the process of dividing a space including points.

A quad tree according to embodiments may petition a space into four parts. The quad-tree of FIG. 18 partitions the space into four spaces for each of the X-axis, Y-axis, and Z-axis.

A binary tree according to embodiments may petition a space into two parts. The binary tree of FIG. 18 partitions a space into two spaces for each of the X-axis, Y-axis, and Z-axis.

The method/device according to the embodiments may configure parameters related to quad-tree partitioning and binary tree partitioning. The QTBT execution method and parameters may include parameters K and M. Accordingly, OT, QT, and BT are carried out in order.

The parameter K according to the embodiments indicates the number of times QTBT is executed in partitioning a 3D bounding box.

The parameter M according to the embodiments indicates the number of times the OT is executed immediately before partitioning for a leaf node level. Here, the number may be interpreted as at least a value greater than or equal to the value thereof. The OT in 3D may be referred to as QT in 2D.

When the 2D example according to the embodiments is extended to 3D, the QT may be interpreted as OT, and the BT may be interpreted as BT or QT.

For example, the following values may be set for a point cloud having a bounding box having dimensions of $2^{\wedge}d\_x$, $2^{\wedge}d\_y$, and $2^{\wedge}d\_z$.

$$K(0 \leq K \leq max(d\_x, d\_y, d\_z) - min(d\_x, d\_y, d\_z))$$

maximum times of QT&BT before OT

This represents the maximum number of times of execution of QT and BT before OT.

$$M(0 \leq\leq min(d\_x, d\_y, d\_z))$$

minimal size of QT&BT, NO QT&BT if $d\_x, d\_y, d\_z \leq M$

This represents the minimum size of QT and BT.

The parameter M according to the embodiments may have a value within the minimum value of the X-axis dimension, Y-axis dimension, and Z-axis dimension and zero. When the X-axis dimension, Y-axis dimension, and Z-axis dimension are less than or equal to M, QT and BT may not be performed.

BT is performed before QT (when $d\_x \neq d\_y \neq d\_z$)

When the X-axis dimension, Y-axis dimension, and Z-axis dimension are different from each other, BT may be performed before QT.

According to embodiments, the number of times OTQTBT is performed is determined as follows according to the size of the bounding box.

$$N(OT) = min(d\_x, d\_y, d\_z)$$

$$N(QT) = med(d\_x, d\_y, d\_z) - min(d\_x, d\_y, d\_z)$$

$$N(BT) = max(d\_x, d\_y, d\_z) - med(d\_x, d\_y, d\_z)$$

The number of times of execution of OT is determined based on the minimum value of the X-axis dimension, Y-axis dimension, and Z-axis dimension.

The number of times of execution of QT is determined based on the difference between the median of the X-axis dimension, Y-axis dimension, and Z-axis dimension, and the minimum value of the X-axis dimension, Y-axis dimension, and Z-axis dimension.

The number of times of execution of BT is determined based on the difference between the maximum value of the X-axis dimension, Y-axis dimension, and Z-axis dimension and the median of the X-axis dimension, Y-axis dimension, and Z-axis dimension.

When QTBT is performed, the total number of executions is determined as follows: $N(OT)+N(QT)+N(BT)=max(d\_x, d\_y, d\_z)$.

It may have the same number of executions as $max(d\_x, d\_y, d\_z)$, which is the total number of executions of OT-based partitioning.

Figure 19:
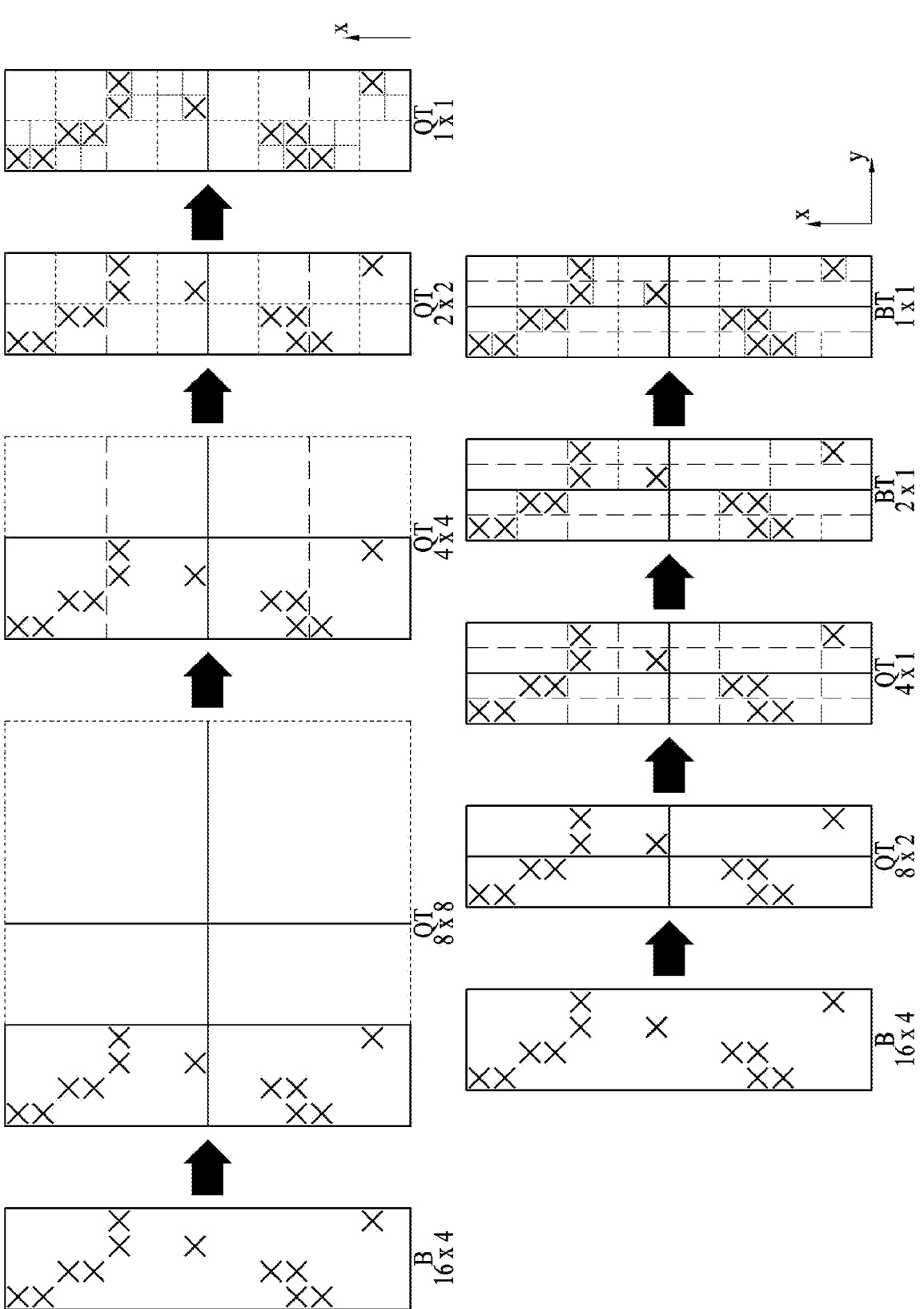
FIG. 19 illustrates a symmetrical bounding box and an asymmetrical bounding box according to embodiments.

FIG. 19 illustrates a symmetrical bounding box and an asymmetrical bounding box according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data based on the bounding box as shown in FIG. 19. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like reconstruct (decode) the point cloud data based on the bounding box as shown in FIG. 19.

FIG. 19 shows the partitioning order according to the use of QTBT for point cloud data distributed in a 16×4 bounding box in a 2D space. For example, the partitioning order according to the embodiments may be extended to a partitioning order according to the use of OT, QT, and BT in a 3D space.

FIG. 19 (A)

The figure shows a case where partitioning is performed using only QT.

FIG. 19 (B)

The figure shows a case where partitioning is performed by QTBT.

In both cases, partitioning is performed four times. In the case of QT-based partitioning, partitioning occurs, assuming that the bounding box is a 16×16 bounding box.

When BT is additionally considered, an asymmetric bounding box of 16×4 may be used, and QT may be performed twice and BT may be performed twice until a 1×1 leaf node is reached. In this example, QTBT parameters K and M are set as K=0 and M=0, and QT, QT, BT, and BT are performed in this order.

In the case of a symmetric bounding box, the size of the partitioned box is constant and symmetrical. In the case of an asymmetric bounding box, the partitioned box has a non-constant size and is asymmetric.

FIG. 20 illustrates partitioning according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data based on the QT and BT as in FIG. 20. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data based on the QT and BT as in FIG. 20.

For generation of a geometry tree in consideration of an asymmetric bounding box, different methods may be used according to the parameters K and M as follows. For point cloud data having a distribution as shown in FIGS. 19 and 20, QT is performed first and then BT is performed according to Scheme 1 of FIG. 19. In this scheme, K and M are set as K=0 and M=0, QT, QT, BT, and BT are performed in this order.

For simplicity, FIG. 20 illustrates a 2D example of partitioning performed in 3D.

Accordingly, when the value of the parameter K is 0 and the value of the parameter M is 0, the number of times the BT is forcibly performed at the beginning may be 0, and the number of times the QT is forcibly performed at the end may be 0.

For simplicity, the diagrams related to schemes 1 to 4 according to the embodiments are presented based on the X-axis and the Y-axis among the X-axis, the Y-axis, and the Z-axis.

FIG. 21 illustrates partitioning according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data based on the QT and BT as shown in FIG. 21. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data based on the QT and BT as shown in FIG. 21.

In Scheme 2, K and M are set as K=2 and M=0 to perform BT twice and then perform QT. In the scheme, BT, BT, QT, and QT are performed in this order.

For simplicity, FIG. 21 illustrates a 2D example of partitioning performed in 3D.

Accordingly, when the value of the parameter K is 2, BT may be initially forcibly performed twice. When M=0, the number of times QT is forcibly performed at the end may be 0.

FIG. 22 illustrates partitioning according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data based on the QT and BT as shown in FIG. 22. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data based on the QT and BT as shown in FIG. 22.

In contrast with Schemes 1 and 2, in which QTs and BTs are grouped and processed at the beginning or the end, QTs and BTs may be performed in random order.

In Scheme 3 according to the embodiments of FIG. 22, K=1 and M=0 are set. Thus, BT is performed once at the beginning, and then BT, QT, QT, and BT are performed in this order.

FIG. 23 illustrates partitioning according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may compress (encode) the point cloud data based on the QT and BT as shown in FIG. 23. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct (decode) the point cloud data based on the QT and BT as shown in FIG. 23.

In Scheme 4 according to the embodiments of FIG. 23, K=1 and M=1 to perform BT once at the beginning and perform QT once just before the end in a manner that BT, QT, BT, and QT are performed in this order.

For the four methods according to the embodiments, coding efficiency may vary according to the execution order of QTBT. To compare coding efficiencies, bits required for each step may be defined as follows.

$$\sum\nolimits_{i=0}^{N} n_{occupied}(i) \times b_{partition}$$

Here, b_partition denotes the number of bits required to identify partitioning.

For example, it may be defined as BT=2^1, QT=2^2, OT=2^3.

n_occupied denotes the number of occupied nodes at the i-th depth level. It indicates the depth in the geometry tree. Accordingly, the number of bits required in each method may be calculated as follows.

Scheme 1 $(QT \rightarrow QT \rightarrow BT \rightarrow BT) = 1 \times 4 + 4 \times 4 + 8 \times 2 + 9 \times 2 = 54$ Scheme 2 $(BT \rightarrow BT \rightarrow QT \rightarrow QT) = 1 \times 2 + 2 \times 2 + 4 \times 4 + 7 \times 4 = 50$ Scheme 3 $(OT \rightarrow BT \rightarrow OT \rightarrow BT) = 1 \times 2 + 2 \times 4 + 5 \times 4 + 9 \times 2 = 48$ Scheme 4 $(OT \rightarrow BT \rightarrow BT \rightarrow OT) = 1 \times 2 + 2 \times 4 + 5 \times 2 + 7 \times 4 = 48$ It may be seen from the above example that Schemes 3 and 4 effectively compress the given point cloud data while using the fewest bits. However, Schemes 3 and 4 do not always have optimal efficiency. Assuming that all leaf nodes of the tree are occupied, the bit usage may be obtained as follows.

Scheme 1 $(QT \rightarrow QT \rightarrow BT \rightarrow BT) =$ $$1 \times 4 + 4 \times 4 + 16 \times 2 + 32 \times 2 = 116$$

Scheme 2 $(BT \rightarrow BT \rightarrow QT \rightarrow QT) = 1 \times 2 + 2 \times 2 + 4 \times 4 + 16 \times 4 = 86$ Scheme 3 $(OT \rightarrow BT \rightarrow OT \rightarrow BT) = 1 \times 2 + 2 \times 4 + 8 \times 4 + 16 \times 2 = 90$ Scheme 4 $(OT \rightarrow BT \rightarrow BT \rightarrow OT) = 1 \times 2 + 2 \times 4 + 8 \times 2 + 16 \times 4 = 90$ That is, in this case, Scheme 2 may have optimal efficiency.

FIG. 24 shows bit usages compared with each other according to embodiments.

FIG. 24 shows the bit usage rates for the QTBT schemes compared with the bit usage rates in the case where only QT is used.

As such, the bit efficiency varies according to the order in which QTBT is performed and the distribution of points, and it is necessary to find an execution order of QTBT having the optimal efficiency.

The method/device according to the embodiments may increase bit efficiency by selecting a method having high coding efficiency among OT, QT, and BT in each step. The octree-based position compression is a method of reducing redundant use of bits by bundling significant bits that are commonly present for points at similar positions. That is, redundancy may be reduced for nodes having the same parent in the octree.

For example, expressing each of positions 0000 and 0001 requires 8 bits. However, by bundling the three redundant significant bits (000) and expressing the remaining bits individually (0, 1) may reduce the required bits from 8 bits to 5 bits.

As another example, 0000, 0001, 0010, and 0011 each require 4 pieces of information in 4 bits, that is, 16 bits. When the information is bundled into two pairs each having two pieces of information (0000 and 0001, 0010 and 0011) having redundant significant bits, only 10 bits ([000+0+1]+ [001+0 +1]) may need to be used to represent the positions.

As another method, when the two most significant bits (00) used in all four pieces of information are grouped together, the next bits are grouped two by two (0, 1), and the least significant bits are expressed respectively (0, 1, 0, 1), the positions may be represented using 8 bits.

FIG. 25 illustrates a scheme for selecting a partitioning method according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may partition the point cloud data based on the schemes shown in FIG. 25. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may partition the point cloud data based on the schemes shown in FIG. 25.

Condition 1)

As described above, bit efficiency may be increased by selecting a scheme of OTQTBT by which as many points at similar positions as possible are bundled according to each step. When points are grouped together according to similar positions, the proportion of empty nodes remaining after partitioning may increase. OT, QT, and BT may be compared in terms of the ratio of the number of empty nodes/the total number of nodes, and the method having the largest proportion of empty nodes may be selected. When the total number of sub-nodes is defined as N_nodes (OT,i) and the number of sub-nodes where points are present is defined as N_occupied (OT,i), the proportion of empty nodes r_OT (i) in OT partitioning performed for the i-th depth may be defined as 25000. As the proportion of the empty nodes increases, the number of redundant bits (points) bundled together may increase.

In the same way, for QT partitioning and BT partitioning, the proportions of empty nodes for the i-th depth, r_QT (i) and r_BT (i), may be defined as 25010, respectively.

In the equations, N_nodes (QT,i) and N_nodes (BT,i) may denote the total number of sub-nodes newly created through QT partitioning and BT partitioning for the i-th depth, and N_occupied (QT,i) and N_occupied (BT,i) may denote the number of sub-nodes in which points are present when QT partitioning and BT partitioning are performed for the i-th depth.

When OT partitioning and QT partitioning are not eligible to be performed, N_nodes (OT,i) or N_nodes (QT,i) may be set to 0. That is, r_OT (i) or r_QT (i) may be defined as 1, which is the maximum value.

FIG. 26 illustrates a scheme for selecting a partitioning method according to embodiments.

In addition to the schemes of FIG. 25, the method/device according to the embodiments may select a partitioning method according to the method illustrated in FIG. 26.

Condition 2)

In addition, N_OT (i), N_QT (i), and N_BT (i), the number of times partitioning may be performed based on an octree, a quad-tree, and a binary tree at the i-th depth may be obtained as follows.

$$N\_OT(i) = \min(d\_x(i), d\_y(i), d\_z(i))$$

$$N\_BT(i) = \max(d\_x(i), d\_y(i), d\_z(i))$$

$$N\_OT(i) = med(d\_x(i), d\_y(i), d\_z(i))$$

or else

Here, min( ), med( ), and max( ) are functions to find the minimum, median, and maximum values.

d_x (i), d_y (i), and d_z (i) are values of log 2 for the size for each of the xyz axes of the sub-node for the i-th depth, and may be obtained as follows.

$$d\_x(i) = \log\_2 \left(x \text{ directional sub-node length}\right)$$

$$d\_y(i) = \log\_2 \left(y \text{ directional sub-node length}\right)$$

$$d\_z(i) = \log\_2 \left(z \text{ directional sub-node length}\right)$$

The directional sub-node length indicates a sub-node length in each axial direction.

The method/device according to the embodiments may obtain a partitioning method at the i-th depth as follows.

1) Among methods enabling partitioning among OT, QT, and BT: Condition 2

2) A method in which the ratio of points which are present at similar positions and bundled together is high: Condition 1

Accordingly, a partitioning method for the i-th depth may be defined as shown in FIG. 27.

FIG. 27 illustrates conditions for selecting a partitioning method according to embodiments.

Referring to part 27000, if the OT empty ratio is less than or equal to the BT empty ratio and is less than or equal to the QT empty ratio, and the possible number of times of OT is greater than 0 at the i-th depth, the point cloud data may be partitioned according to the OT at the i-th depth.

If the QT empty ratio is less than or equal to the BT empty ratio, and is less than or equal to the OT empty ratio the i-th depth when the possible number of times of OT is greater than 0, or when the possible number of times of OT is 0 and the possible number of times of QT is greater than 0, the point cloud data may be partitioned according to QT at the i-th depth.

If the OT empty ratio is less than or equal to the BT empty ratio and is less than or equal to the QT empty ratio, and the possible number of times of OT is greater than 0 at the i-th depth, the point cloud data may be partitioned according to the OT at the i-th depth.

According to the method described above, if two or more methods are tied when OT, QT, and BT are all allowed, a method in which more sub-nodes may be created may be selected. For example, if OT and QT are tied, OT may be selected. If QT and BT are tied, QT may be selected. If OT, QT and BT are tied, OT may be selected.

When a point cloud distributed in a 16×4 asymmetric bounding box is partitioned using the method according to the embodiments, the same result as scheme 1 is obtained. Part 27010 illustrates the partitioning process in detail.

In determining first partitioning, QT is selected because the possible number of times of QT is 2, the possible number of times of BT is 4, the QT empty ratio is 0/4, the BT empty ratio is 0/2, and more sub-nodes are created in QT.

In determining second partitioning, the possible number of times of QT is 1, the possible number of times of BT is 3, the QT empty ratio is 8/16, the BT empty ratio is 3/8, and QT providing a high empty ratio is selected.

In determining third partitioning, the possible number of times of QT is 0, the possible number of times of BT is 2, and BT is selected along the X-axis.

In determining fourth partitioning, the possible number of times of QT is 0, the possible number of times of BT is 1, and BT is selected along the X-axis.

According to embodiments, partitioning may subdivided to have more depths. When many depths are provided, partitioning may be further subdivided for scalable coding, and the receiver may be allowed to select a required depth. For example, OT may be divided into xyz axis BTs. When the partitioning types are tied, BT, QT, and OT may be selected in this order such that partitioning may be performed sequentially.

Referring to part 27020, if the OT empty ratio is less than the BT empty ratio, the OT empty ratio is less than the QT empty ratio, and the possible number of times of OT is greater than 0, OT partitioning may be performed.

If the QT empty ratio is less than the BT empty ratio, the QT empty ratio is less than or equal to the OT empty ratio, and the possible number of times of QT is greater than 0, or if the possible number of times of OT is 0 and the possible number of times of QT is greater than 0, QT partitioning may be performed.

If the BT empty ratio is less than or equal to the QT empty ratio, the BT empty ratio is less than or equal to the OT empty ratio, and the possible number of times of BT is greater than 0, or if the QT empty ratio is 0, BT partitioning may be performed.

When a point cloud distributed in a 16×4 asymmetric bounding box is partitioned using the method according to the embodiments, the same result as in scheme 3 is obtained.~~~~The partitioning process is analyzed in detail in part 27030.

In performing the first partitioning, if the possible number of times of QT is 2, the possible number of times of BT is 4, the QT empty ratio is 0/4, and the BT empty ratio is 0/2, BT partitioning may be performed along the X-axis.

In performing the second partitioning, if the possible number of times of QT is 2, the possible number of times of BT is 3, the QT empty ratio is 3/8, and the possible number of times of BT is 0/4, QT partitioning may be selected as a partitioning type.

In performing the third partitioning, if the possible number of times of QT is 1, the possible number of times of BT is 2, the QT empty ratio is 11/20, and the possible number of times of BT is 3/10, QT partitioning may be selected as a partitioning type.

In performing the fourth partitioning, if the possible number of times of QT is 4 and the possible number of times of BT is 1, BT partitioning may be performed.

According to embodiments, a condition may be added. In the case of an asymmetric node, BT and QT may be first performed in the direction of the symmetric node, and then the operation according to the above condition may be performed.

Also, QTBT parameters K and M may be inferred based on the derived partitioning method and signaled. For example, when compression is performed through BT, QT, QT, and BT, K=1 may be set because the first BT is performed once, and M=0 may be signaled because the number of times QT is performed at the end is 0.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may encode geometry data and attribute data, and generate a bitstream containing the geometry data and the attribute data. In addition, it may generate signaling information (or referred to as metadata, parameter information, or the like) related to encoding of the point cloud data and add the same to the bitstream to be transmitted.

The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may receive the bitstream containing the geometry data, the attribute data, and the signaling information related to the geometry data and the attribute data.

OTQTBT partitioning information according to embodiments may be defined in a parameter set and a slice header carried by the bitstream containing the point cloud data. In addition, it may be defined at a corresponding position according to the application and system or at a separate position, such that the scope of application and the method of application may be used differently.

According to embodiments, the partitioning-related signaling information according to the embodiments may be included in the geometry parameter set and the geometry slice header in the bitstream. The partitioning-related signaling information according to the embodiments may be defined in the attribute parameter set and the attribute slice header in the bitstream so as to be associated with an attribute coding method or be applied to attribute coding. The partitioning-related signaling information according to the embodiments may be defined in the sequence parameter set, the tile parameter set, and the like in the bitstream.

In addition, when a syntax element contained in the bitstream according to the embodiments is applicable to a plurality of point cloud data streams as well as a current point cloud data stream, the information may be carried in a parameter set of a higher concept.

The signaling information according to the embodiments may be generated in the compression (encoding) process of the point cloud compression transmission device/method, and may be used in a decoding process of the point cloud compression reception device/method.

Hereinafter, parameters (which may be referred to as various terms such as metadata and signaling information) according to embodiments may be generated in a process of a transmitter according to embodiments, which will be described later, and transmitted to a receiver according to the embodiments so as to be used in a reconstruction process. For example, the parameters according to the embodiments described below may be generated by the metadata processor (or metadata generator) of the transmission device according to the embodiments and acquired by the metadata parser of the reception device according to the embodiments.

FIG. 28 shows a set of geometry parameters according to embodiments.

num_tree_depth_minus1+1 may indicate the depth of a geometry tree.

partition_type may indicate a method of configuring an (i+1)-th depth in configuring a geometry tree according to embodiments.

Among the values thereof, 0 may indicate octree-based partition (OT), 1 may indicate quad-tree-based partition (QT), and 2 may indicate binary-tree-based partition (BT).

partition_axis may indicate the partitioning direction according to the partition type. When the partition_type indicates 1, that is, quad-tree partition, partition_axis may indicate that partitioning is performed based on the xy, xz, and yz axes. When partition_type indicates 2, that is, binary tee partition, partition_axis may indicate that partitioning is performed based on the x, y, and z axes.

log 2_node_size_x, log 2_node_size_y, and log 2_node_size_z may indicate the length of a unit node of the i-th depth along the x, y, and z axes expressed as values for log_2. It may be used when partitioning is performed based on any node size (e.g., 4×4×1, 16×8×8, etc.).

FIG. 29 illustrates a geometry slice bitstream and a geometry slice header according to embodiments.

A geometry slice bitstream may contain a geometry slice header and geometry slice data.

For the definition of the same parameters as the partitioning-related parameters in FIG. 28, reference may be made to the description of FIG. 28.

start_tree_depth and end_tree_depth may indicate the start and end of the tree depth. They may be used when the data is divided into slices according to a tree depth or a scalable application.

full_depth_present_flag may indicate whether a tree according to embodiments has a full depth or not. When the value of the flag is 0, the start and end of a tree depth may be delivered scalably or according to a specific tree depth as signaling information.

Information such as partition_type, partition_axis, and node_size along each axis may be transmitted according to the tree depth start and tree depth end, or the total number of tree depths.

The operations of the above-described embodiments may be performed through components of the point cloud compression transmission/reception device/method according to the embodiments. Each component according to the embodiments may correspond to hardware, software, a processor, and/or a combination thereof.

The point cloud compression method proposed in the present disclosure may be implemented as follows. Although this embodiment describes a method of compressing position information about point cloud data, the method described in the present disclosure may be applied to attribute information compression and other compression methods.

The configuration and/or operation of a point cloud encoder, for example, an attribute encoder, of the transmission device according to the embodiments may be as follows.

Figure 30:
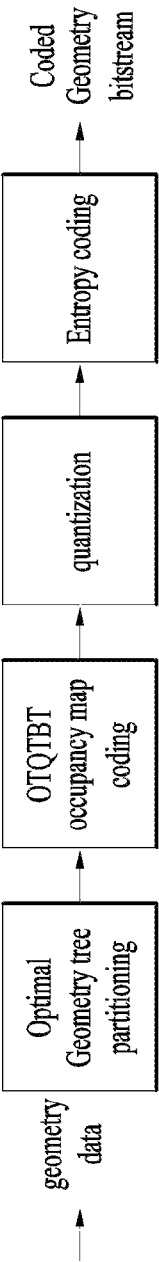
FIG. 30 illustrates a point cloud data transmission method according to embodiments.

FIG. 30 illustrates a point cloud data transmission method according to embodiments.

The transmission device 10000 of FIG. 1, the point cloud video encoder 10002 of FIG. 1, the encoding of FIG. 2, the encoder of FIG. 4, the transmission device of FIG. 13, the device of FIG. 14, or the like may encode the point cloud data shown in FIG. 30. The transmission device 10000 of FIG. 1, the point cloud video encoder 10002 of FIG. 1, the encoding of FIG. 2, the encoder of FIG. 4, the transmission device of FIG. 13, the device of FIG. 14, or the like may include an optimal geometry tree partitioner, an OTQTBT occupancy map coder, a quantizer, and an entropy coder. The components of FIG. 30 may be implemented by hardware including one or more processors or integrated circuits configured to communicate with one or more memories included in the point cloud data transmission device, software, firmware, or a combination thereof.

The optimal geometry tree partitioner 30000 may receive geometry data and process the geometry data in a process of geometry coding as follows. The optimal geometry tree partitioner may perform partitioning according to a geometry tree depth and acquire partitioning information.

The OTQTBT occupancy map coder 30010 may generate an occupancy bit based on the acquired partitioning information as shown in FIGS. 15 and 23.

The quantizer 30020 may quantize the point cloud data based on the occupancy bit. The quantization operation may be optional.

The encoding coder 30030 may encode the point cloud data based on the entropy method and generate a geometry bitstream containing the geometry data of the point cloud data.

The method/device according to the embodiments may encode attribute data based on the geometry data and generate an attribute bitstream containing the attribute data.

The method/device according to the embodiments may transmit a bitstream containing the geometry data and the attribute data.

Figure 31:
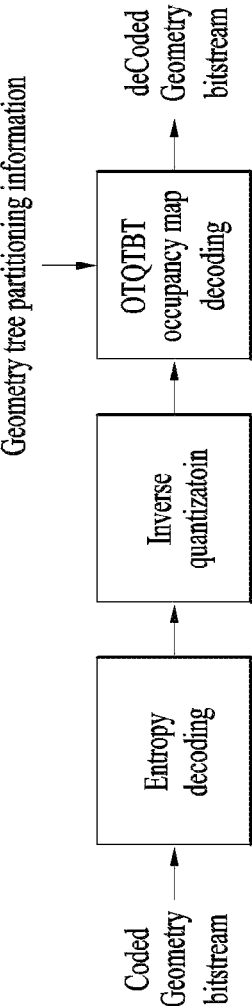
FIG. 31 illustrates a point cloud data reception method according to embodiments.

FIG. 31 illustrates a point cloud data reception method according to embodiments.

The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may decode the point cloud data shown in FIG. 31. The reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may include an entropy decoder, an inverse quantizer, and an OTQTBT occupancy map decoder. The components of FIG. 31 may be implemented by hardware including one or more processors or integrated circuits configured to communicate with one or more memories included in the point cloud data transmission device, software, firmware, or a combination thereof.

A process of receiving point cloud data according to embodiments may follow the reverse of the process of transmitting the point cloud data according to the embodiments. That is, the receiver reconstructs the signal in the reverse order of the operations of the transmitter.

The entropy decoder 31000 may receive an encoded geometry bitstream from the transmission device and process the geometry data as follows. The entropy decoder may decode the geometry data based on the entropy scheme.

The inverse quantizer 31010 may inversely quantize the geometry data. The inverse quantization operation may be optional.

The OTQTBT occupancy map decoder 31020 may decode the occupancy bit. After entropy decoding and inverse quantization are performed on the received geometry bitstream by the receiver, the geometry data may be reconstructed based on the occupancy bit. In this case, the bit length and distribution of the decoded information for each depth may be estimated based on the total number of geometry tree depths, a partitioning method for each depth, the partition direction, and the node size information provided through num_tree_depth_minus1, partition_type, partition_axis, log 2_node_size_x, log 2_node_size_y, and log 2_node_size_z contained in the bitstream delivered from the transmitter as shown in FIGS. 28 and 29.

The geometry tree partitioning information according to the embodiments may include the total number of geometry tree depths, a partitioning method for each depth, the partition direction, and the node size information provided through num_tree_depth_minus1, partition_type, partition_axis, log 2_node_size_x, log 2_node_size_y, and log 2_node_size_z.

Figure 32:
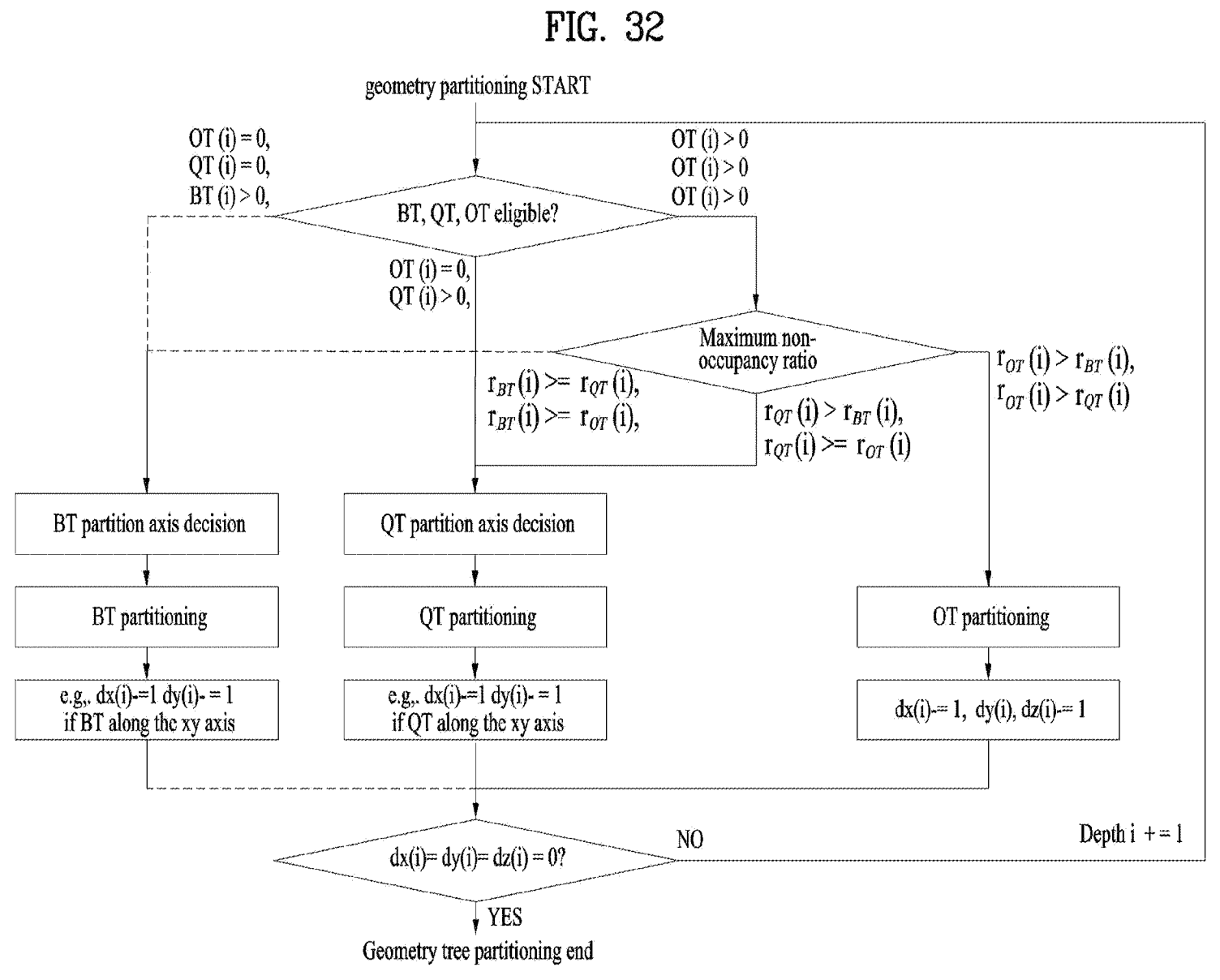

FIG. 32 is a flowchart illustrating encoding of point cloud data according to embodiments.

FIG. 32 shows a flowchart of geometry partitioning of point cloud data according to FIGS. 30 and 31.

Regarding each operation and corresponding operations in FIG. 32, the transmission device 10000 of FIG. 1, the point cloud video encoder 10002 of FIG. 1, the encoding of FIG. 2, the encoder of FIG. 4, the transmission device of FIG. 13, the device of FIG. 14, or the like may encode the point cloud data like as shown in FIG. 30. The transmission device 10000 of FIG. 1, the point cloud video encoder 10002 of FIG. 1, the encoding of FIG. 2, the encoder of FIG. 4, the transmission device of FIG. 13, the device of FIG. 14, the encoder of FIG. 30, the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may decode the point cloud data shown in FIG. 31. The operation may be performed by the reception device 10004 of FIG. 1, the point cloud video decoder 10006 of FIG. 1, the decoding of FIG. 2, the decoder of FIGS. 10 and 11, the reception device of FIG. 14, the decoder of FIG. 31, or the like. The operations of FIG. 32 may be implemented by hardware including one or more processors or integrated circuits configured to communicate with one or more memories included in a device according to embodiments, software, firmware, or a combination thereof.

32000: The method/device according to the embodiments may check whether BT, QT, OT, and the like are allowed to partition the geometry. As shown in FIG. 26, OT(i), QT(i), and BT(i) may be measured to determine whether performing OT, QT, and BT is allowed according to the size of the i-th node along each axis. According to the values thereof, OT, QT or BT may be directly performed.

FIG. 32 is an exemplary flowchart illustrating a method for asymmetric geometry tree partitioning optimization. When geometry tree partitioning starts, it is determined whether OT, QT, and BT are eligible based on the node size.

32010: When the value of information indicating whether OT is eligible to be performed is 0, the value of information indicating whether QT is eligible to be performed is 0, and the value of information indicating whether BT is eligible to be performed is greater than 0 at the i-th depth of the geometry tree, the method/device according to the embodiments may determine the BT partitioning axis (32010). The partitioning axis may be transmitted in the bitstream as shown in FIGS. 27 and 28. The geometry may be divided through BT partitioning according to the partitioning axis. In addition, after BT partitioning along the X-axis, the size of the node at the i-th depth along the X-axis may be reduced by 1.

32020: When the value of information indicating whether OT is eligible to be performed is 0, and the value of information indicating whether QT is greater than 0 at the i-th depth of the geometry tree, the method/device according to the embodiments may determine the axis on which QT partitioning is to be performed, and perform the QT partitioning. In addition, after performing QT partitioning along the XY axis, the method/device may reduce the size of the node at the i-th depth along each of the X and Y axes by 1.

32020: When OT, QT, and BT are all eligible to be performed, r_OT(i), r_QT(i), and r_BT(i), which are non-occupancy ratios (or empty node ratios) according to each method, are obtained as shown in FIG. 25.

An optimal partitioning method is determined according to a condition (e.g., the greatest value is obtained) (32030). In the case of QT and BT, different non-occupancy ratios may be obtained depending on the partitioning axis, and it may be predefined that QT and BT are applied in the direction in which the current node size has the longest length.

When the BT empty ratio is greater than or equal to the QT empty ratio and the BT empty ratio is greater than or equal to the OT empty ratio, BT partitioning may be selected.

When the QT empty ratio is greater than the BT empty ratio and the QT empty ratio is greater than or equal to the OT empty ratio, QT partitioning may be selected.

When the OT empty ratio is greater than the BT empty ratio and the OT empty ratio is greater than the QT empty ratio, OT partitioning may be selected.

Also, in performing OT partitioning, the node size along each axis may be reduced by 1 along each axis.

If the node size on each XYZ axis at the i-th depth is 0, geometry tree partitioning is terminated. Otherwise, the partitioning process is performed for the i+1-th depth.

When the optimal partitioning method for depth i is determined, QTBT is performed along the partitioning axis or OT is performed in all directions. Thereafter, the node size is adjusted according to the partitioning method and partitioning axis. That is, dx(i), dy(i), and dz(i), which have log 2 values for the node size, decrease by 1 on the axis along which partitioning occurs. It is determined whether the node is a leaf node (dx(i)=dy(i)=dz(i)=0). When the node is at the leaf node level, partitioning is stopped. When the node is not at the leaf node level, the depth is increased by 1 and the above process is performed.

Figure 33:
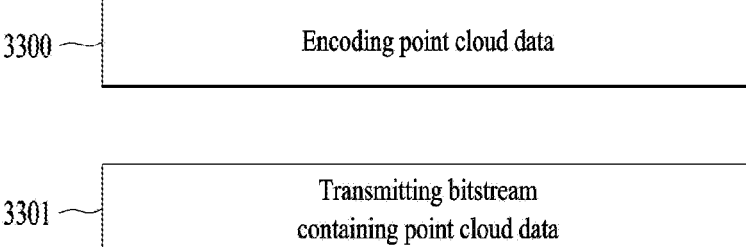
FIG. 33 illustrates a point cloud data transmission method according to embodiments.

FIG. 33 illustrates a point cloud data transmission method according to embodiments.

3300: The point cloud data transmission method according to the embodiments may include encoding point cloud data. The encoding operation according to the embodiments may include the operations of the point cloud video encoder 10002 of FIG. 1, the encoding 20001 of FIG. 2, the encoder of FIG. 4, the transmission device of FIG. 12, the device processing of FIG. 14, partitioning of point cloud data according to FIGS. 15 to 27, the bitstream generation of FIGS. 28 and 29, and partitioning and encoding of point cloud data of FIGS. 20 to 32.

3301: The point cloud data transmission method according to the embodiments may further include transmitting a bitstream containing the point cloud data. The transmission operation according to the embodiments may include the operations of the transmitter of FIG. 1, the transmission of FIG. 2, the transmission of the encoded bitstream of FIG. 4, the transmission of the encoded point cloud data of FIG. 12, the processing of the device of FIG. 14, the transmission of the encoded point cloud data based on partitioning according to FIGS. 15 to 27 and 30 to 32, and the transmission of a bitstream containing parameters related to the point cloud data of FIGS. 28 and 29.

Figure 34:
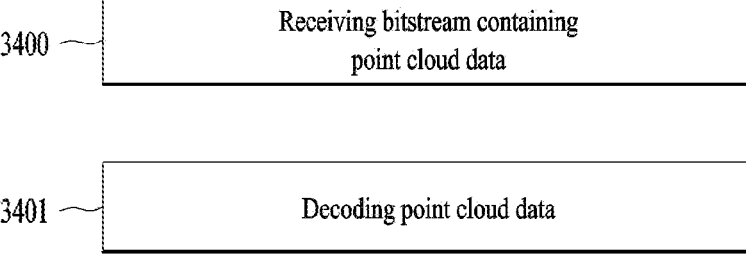
FIG. 34 illustrates a point cloud data reception method according to embodiments.

FIG. 34 illustrates a point cloud data reception method according to embodiments.

3400: The point cloud data reception method according to the embodiments may include receiving a bitstream containing point cloud data. The reception operation according to the embodiments may include the operations of the receiver 10005 of FIG. 1, the reception according to the transmission 20002 of FIG. 2, the reception of the geometry bitstream and the attribute bitstream of FIG. 11, the reception of the bitstream containing the point cloud data of FIG. 13, the data reception by the device of FIG. 14, the reception of the encoded point cloud data based on partitioning according to FIGS. 15 to 27 and 30 to 32, and the reception of a bitstream containing parameters related to the point cloud data of FIGS. 28 and 29.

3401: The point cloud data reception method according to the embodiments may further include decoding the point cloud data. The decoding operation according to the embodiments may include the operations of the point cloud video decoder 10006 of FIG. 1, the decoding 20003 of FIG. 2, the decoding of the point cloud data of FIGS. 10, 11 and 13, the data processing of the device of FIG. 14, the decoding of the point cloud data based on partitioning according to FIGS. 15 to 27 and 30 to 32, and the decoding of the point cloud data based on parameters related to the point cloud data of FIGS. 28 and 29.

The methods according to the embodiments of FIGS. 33 and 34 may be implemented by hardware including one or more processors or integrated circuits configured to communicate with one or more memories included in the point cloud data transmission/reception device, software, firmware, or a combination thereof.

A point cloud data transmission device according to embodiments may include an encoder configured to encode point cloud data; and a transmitter configured to transmit a bitstream containing the point cloud data.

The encoder configured to encode the point cloud data according to the embodiments may partition geometry data of the point cloud data based on a tree (see FIGS. 15 to 23 and the like).

The partitioning according to the embodiments may determine a type of the tree based on a distribution of the geometry data. The type of the tree may include at least one of an octree, a binary tree, or a quad tree (see FIGS. 25 to 27).

The partitioning according to the embodiments may be performed in consideration of a distribution of the point cloud data, for example, a distribution of points which are geometry data.

As shown in FIG. 19, OT, QT, BT, and the like may be efficiently applied to a symmetric distribution and/or an asymmetric distribution.

The partitioning type and order may be determined by the methods shown in FIGS. 25-27, and the order of OT, QT, and BT may be set differently according to embodiments. In addition, the tree types are not not limited to OT, QT, and BT, and various tree types capable of efficiently dividing the distribution of points may be applied according to embodiments.

The mathematical expressions shown in FIG. 27 to compare the trees in terms of a ratio may be extended and interpreted within the equivalent range. Symbols such as an inequality sign and an equal sign used in the mathematical expressions are not limited to the contents shown in the drawings and may be interpreted within the scope intended by the embodiments.

The type of the tree according to the embodiments may be determined based on a ratio related to whether a node included in the current depth of the tree of geometry data is occupied.

The bitstream according to embodiments may contain parameter information related to the point cloud data (see FIGS. 28 and 29).

A point cloud data reception device according to embodiments may include a receiver configured to receive a bitstream containing point cloud data; and a decoder configured to decode the point cloud data.

The decoder configured to decode the point cloud data according to the embodiments may reconstruct the partitioned point cloud data based on a tree related to geometry data of the point cloud data (see FIG. 31).

The type of the tree may include at least one of an octree, a binary tree, or a quad tree.

The type of the tree may be determined based on a ratio related to whether a node included in the current depth of the tree of the geometry data is occupied (see FIGS. 25, 26, and the like).

The bitstream according to the embodiments may include tree partitioning information related to geometry of the point cloud data (see FIGS. 28, 29, and 31).

Accordingly, data may be compressed more effectively. For example, data acquired by LiDAR has a wider distribution in the horizontal direction than in the vertical direction. When such data is compressed, the compression efficiency may be increased through the method according to the embodiments.

In addition, individual QTBT may be applied to individual frames, thereby reflecting the characteristics of distribution of points of content. In addition, an optimal position compression method and parameter configuration for optimal compression may be implemented in consideration of asymmetric point distribution.

When the distribution of the point cloud data is asymmetric, the proposed operations according to the embodiments may provide optimal position structure coding. In addition, the reception method/device according to the embodiments may increase the compression efficiency of the point cloud data based on the parameters in signaling information for the optimal coding.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related details have been described in the best mode for carrying out the embodiments.

INDUSTRIAL APPLICABILITY

As described above, the embodiments are fully or partially applicable to a point cloud transmission/reception device and system.

Those skilled in the art may change or modify the embodiments in various ways within the scope of the embodiments.

Embodiments may include variations/modifications within the scope of the claims and their equivalents.

The invention claimed is:

1. A method of encoding point cloud data, the method comprising:

encoding geometry data of point cloud data; and encoding attribute data of the point cloud data, wherein the encoded geometry data and the encoded attribute data are included in a bitstream, wherein the geometry data is partitioned based on log 2 of a node size for each of depths of a tree, wherein the geometry data is decoded based on a start depth of the tree for scalable decoding, and wherein the bitstream includes information related to a partition type of the geometry data, and information related to a partition block size.

2. The method of claim 1, wherein the method further comprises:

determining a type of the tree based on a distribution of the geometry data, wherein the type of the tree comprises at least one of an octree, a binary tree, or a quad tree.

3. The method of claim 2, wherein the type of the tree is determined based on a ratio related to whether a node included in a current depth of the tree of the geometry data is occupied.

4. The method of claim 1, wherein the bitstream contains parameter information related to the point cloud data.

5. A device for encoding point cloud data, the device comprising:

a memory; and at least one processor connected to the memory, the at least one processor configured to:

encode geometry data of point cloud data; and encode attribute data of the point cloud data, wherein the encoded geometry data and the encoded attribute data are included in a bitstream, wherein the geometry data is partitioned based on log 2 of a node size for each of depths of a tree, wherein the geometry data is decoded based on a start depth of the tree for scalable decoding, and wherein the bitstream includes information related to a partition type of the geometry data, and information related to a partition block size.

6. The device of claim 5, wherein the at least one processor is further configured to:

determine a type of the tree based on a distribution of the geometry data, wherein the type of the tree comprises at least one of an octree, a binary tree, or a quad tree.

7. The device of claim 6, wherein the type of the tree is determined based on a ratio related to whether a node included in a current depth of the tree of the geometry data is occupied.

8. The device of claim 5, wherein the bitstream contains parameter information related to the point cloud data.

9. A method of decoding point cloud data, the method comprising:

decoding geometry data of point cloud data in a bitstream; and decoding attribute data of the point cloud data, wherein the geometry data is partitioned based on log 2 of a node size for each of depths of a tree, wherein the geometry data is decoded based on a start depth of the tree for scalable decoding, and wherein the bitstream includes information related to a partition type of the geometry data, and information related to a partition block size.

10. The method of claim 9, wherein a type of the tree comprises at least one of an octree, a binary tree, or a quad tree.

11. The method of claim 10, wherein the type of the tree is determined based on a ratio related to whether a node included in a current depth of the tree of the geometry data is occupied.

12. A device for decoding point cloud data, the device comprising:

a memory; and at least one processor connected to the memory, the at least one processor configured to:

decode geometry data of point cloud data in a bitstream; and decode attribute data of the point cloud data, wherein the geometry data is partitioned based on log 2 of a node size for each of depths of a tree, and wherein the geometry data is decoded based on a start depth of the tree for scalable decoding, and wherein the bitstream includes information related to a partition type of the geometry data, and information related to a partition block size.

13. The device of claim 12, wherein a type of the tree comprises at least one of an octree, a binary tree, or a quad tree.

14. The device of claim 13, wherein the type of the tree is determined based on a ratio related to whether a node included in a current depth of the tree of the geometry data is occupied.

* * * * *